(12) United States Patent
Hu et al.

(10) Patent No.: US 12,345,930 B2
(45) Date of Patent: Jul. 1, 2025

(54) MAGNETIC-FIELD-TUNABLE TERAHERTZ OPTOELECTRONIC TRANSDUCER

(71) Applicant: Wisconsin Alumni Research Foundation, Madison, WI (US)

(72) Inventors: Jiamian Hu, Middleton, WI (US); Shihao Zhuang, Madison, WI (US); Chang-Beom Eom, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 265 days.

(21) Appl. No.: 18/298,685

(22) Filed: Apr. 11, 2023

(65) Prior Publication Data

US 2024/0345338 A1 Oct. 17, 2024

(51) Int. Cl.
*H04B 10/00* (2013.01)
*G02B 6/42* (2006.01)
*H04B 10/50* (2013.01)

(52) U.S. Cl.
CPC ......... *G02B 6/4215* (2013.01); *G02B 6/4283* (2013.01); *H04B 10/505* (2013.01)

(58) Field of Classification Search
CPC .. G02B 6/4215; G02B 6/4283; G02B 6/1226; H04B 10/505; G02F 1/011
See application file for complete search history.

(56) References Cited

U.S. PATENT DOCUMENTS

| | | | |
|---|---|---|---|
| 8,525,619 B1 | 9/2013 | Olsson | |
| 9,048,632 B1* | 6/2015 | Dantus | H01S 3/06791 |
| 2006/0022141 A1* | 2/2006 | Zhang | G01Q 60/12 |
| | | | 250/341.1 |
| 2010/0328328 A1* | 12/2010 | Choi | B06B 1/0688 |
| | | | 345/82 |
| 2016/0240707 A1* | 8/2016 | Preu | H01S 5/3013 |
| 2017/0123291 A1* | 5/2017 | Vampa | G02F 1/3556 |
| 2019/0120219 A1* | 4/2019 | Calomeris | H05H 1/2406 |
| 2019/0383723 A1* | 12/2019 | Thakur | G01N 15/0205 |
| 2020/0036076 A1* | 1/2020 | Wu | H10F 77/124 |
| 2020/0363444 A1* | 11/2020 | Tillotson | G01F 1/588 |
| 2022/0165468 A1* | 5/2022 | Bandyopadhyay | H04M 1/03 |
| 2024/0345338 A1* | 10/2024 | Hu | G02F 1/011 |

OTHER PUBLICATIONS

Hoppe, Wolfgang, et al. "On-chip generation of ultrafast current pulses by nanolayered spintronic terahertz emitters." ACS Applied Nano Materials 4.7 (2021): 7454-7460.

(Continued)

*Primary Examiner* — Agustin Bello
(74) *Attorney, Agent, or Firm* — Bell & Manning, LLC

(57) ABSTRACT

Optoelectronic transducers that convert a femtosecond (fs)-timescale laser pulse into an a.c. electrical current pulse with an extremely high frequency and a high quality factor (Q) are provided. Both the frequency and amplitude of the a.c. electrical current pulse can be dynamically tuned by the application of a varying bias magnetic field. The optoelectronic transducers are based on a trilayered freestanding membrane that functions as both an acoustic cavity and a magnon cavity. The freestanding membrane includes an electrical conductor layer, a magnetic insulator layer, and a dielectric layer arranged in a vertical stack.

21 Claims, 21 Drawing Sheets

(56) References Cited

OTHER PUBLICATIONS

Kum, Hyun S., et al. "Heterogeneous integration of single-crystalline complex-oxide membranes." Nature 578.7793 (2020): 75-81.

Yoon, Hyojin, et al. "Freestanding epitaxial SITIO3 nanomembranes via remote epitaxy using hybrid molecular beam epitaxy." Science Advances 8.51 (2022): eadd5328.

Azovtsev, Andrei V., and Nikolay A. Pertsev. "Excitation of high-frequency magnon modes in magnetoelastic films by short strain pulses." Physical Review Materials 4.6 (2020): 064418.

Besse, V., et al. "Generation of exchange magnons in thin ferromagnetic films by ultrashort acoustic pulses." Journal of Magnetism and Magnetic Materials 502 (2020): 166320 (As published by arxiv.).

Henighan, T., et al. "Generation mechanism of terahertz coherent acoustic phonons in Fe." Physical Review B 93.22 (2016): 220301.

Kimling, Johannes, et al. "Picosecond spin Seebeck effect." Physical review letters 118.5 (2017): 057201 (Preprint publication version.).

Mosendz, O., et al. "Detection and quantification of inverse spin Hall effect from spin pumping in permalloy/normal metal bilayers." Physical Review B 82.21 (2010): 214403.

Scherbakov, A. V., et al. "Coherent magnetization precession in ferromagnetic (Ga, Mn) As induced by picosecond acoustic pulses." Physical review letters 105.11 (2010): 117204 (As published by arxiv.).

Temnov, Vasily V., et al. "Femtosecond nonlinear ultrasonics in gold probed with ultrashort surface plasmons." Nature communications 4.1 (2013): 1468.

Vernik, Urban, et al. "Resonant phonon-magnon interactions in freestanding metal-ferromagnet multilayer structures." Physical Review B 106.14 (2022): 144420.

Xiao, Jiang, et al. "Theory of magnon-driven spin Seebeck effect." Physical Review B 81.21 (2010): 214418 (As published by arxiv).

Zhuang, Shihao, and Jia-Mian Hu. "Excitation and detection of coherent sub-terahertz magnons in ferromagnetic and antiferromagnetic heterostructures." npj Computational Materials 8.1 (2022): 167.

Tas, Guray, and Humphrey J. Maris. "Electron diffusion in metals studied by picosecond ultrasonics." Physical Review B 49.21 (1994): 15046.

Jäger, J. V., et al. "Picosecond inverse magnetostriction in galfenol thin films." Applied Physics Letters 103.3 (2013).

\* cited by examiner

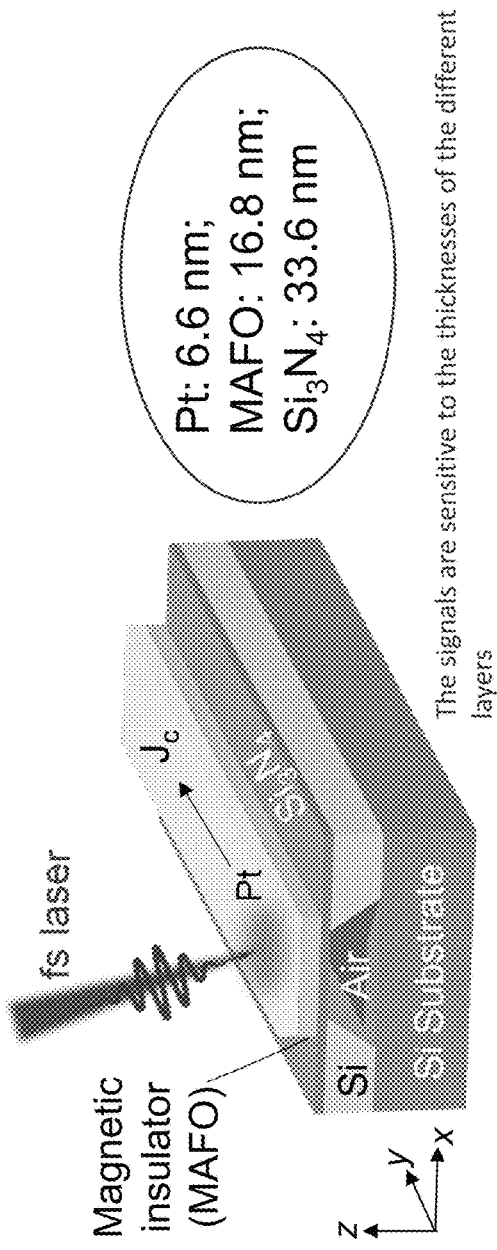
FIG. 9A
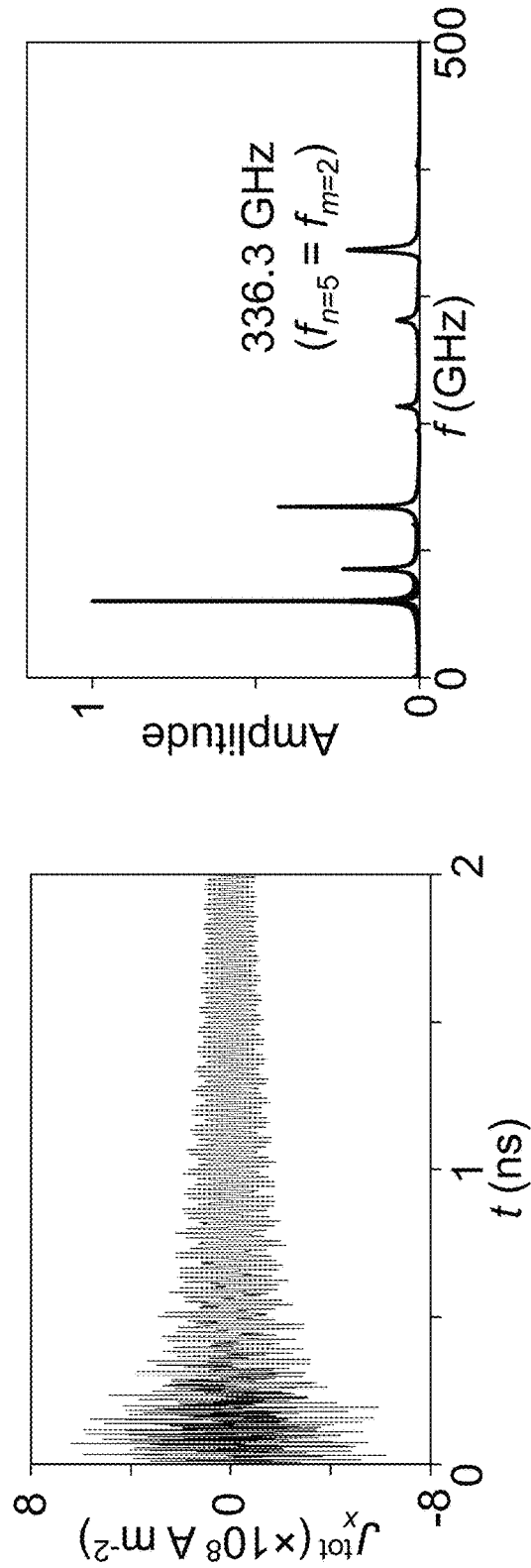
FIG. 9B
FIG. 9C

MAGNETIC-FIELD-TUNABLE TERAHERTZ OPTOELECTRONIC TRANSDUCER

REFERENCE TO GOVERNMENT RIGHTS

This invention was made with government support under 2006028 awarded by the National Science Foundation. The government has certain rights in the invention.

BACKGROUND

An optoelectronic oscillator (OEO) is a system that can convert continuous light waves into periodic electrical current oscillations. A typical OEO system is composed of electrical and optical devices including an electro-optical modulator (EOM), photodetector, optical fiber, amplifier, and filter. The optical part and the electrical part are connected to form a closed optoelectronic feedback loop to enable self-sustained oscillation, where the EOM is used to modulate the electrical signal onto the optical signal, and the photodetector is used to convert the optical signal into the electrical signal. As a representative hybrid electronics and photonics system, the OEO has been widely implemented in generating electrical current (or microwave) or optical signals. OEOs are capable of generating electrical signals of frequencies up to 100 GHz with ultra-low phase noise. Compared to an electronic circuit whose phase noise increases significantly with the oscillation frequency, the phase noise of an OEO is largely frequency independent due to the use of high-quality-factor optical storage elements, making it promising to use OEOs in high-frequency regimes, especially for frequency >10 GHz. Examples of the end-applications of the OEO include the sensing of strain, temperature and refractive index, reservoir computing, and signal processing such as signal amplification, frequency multiplication and division.

The development of next generation high-data-rate wireless communication systems requires the generation of multi-cycle electric signals in the millimeter-wave (mmW: 30-300 GHz) and terahertz (e.g., THz: 300-3000 GHz) frequency band. However, the maximum operation frequency of an OEO is typically below 100 GHz due to various constraints from the monolithic optical and electrical device components. For example, a photodiode, which is commonly used as the photodetector (optoelectronic transducer) in the OEO, enables the light-to-electric current conversion by using the built-in electric field of the diode to drive the motion of the photoexcited charge carriers. However, the mobility of these drifting charge carriers (electron-hole pairs) in the diode is not high enough for generating sinusoidal alternating electrical current with mmW/THz frequencies.

SUMMARY

Optoelectronic transducers that convert a femtosecond (fs)-timescale laser pulse into an alternating electrical current pulse are provided.

One embodiment of an optoelectronic device includes at least one optoelectronic transducer, the at least one optoelectronic transducer including: a membrane suspended over an air gap, the membrane comprising: a layer of dielectric material covering at least a portion of the air gap; a layer of a magnetic insulator over the layer of dielectric material; and a layer of electrically conductive material over the layer of the magnetic insulator. The device further includes a femtosecond laser configured to direct a femtosecond-timescale light pulse onto the layer of the electrically conductive material.

The optoelectronic transducers can be used to generate an alternating electrical current by directing a fs-timescale laser pulse onto the layer of electrically conductive material, whereby the fs-timescale laser pulse excites standing longitudinal acoustic phonon modes and standing magnon modes in the membrane and at least one standing longitudinal acoustic phonon mode is in resonance with at least one standing magnon mode at a resonance frequency, and further whereby an in-plane electrical pulse having a sinusoidally varying alternating current is generated in the layer of electrically conductive material. The in-plane electrical pulse has a resonantly-enhanced oscillation frequency at the resonance frequency.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

As illustrated in FIG. 1C, the precessing magnetizations at the interface between the magnetic and electrically conductive layers results in the injection of a spin current $J_s$ into the electrically conductive layer, and the $J_s$ is converted to charge current $J_c$ in the electrically conductive layer typically via the inverse spin Hall effect. FIG. 1D (right panel) shows a resonantly-enhanced oscillation frequency of the charge current pulse.

where $f_{m=1}$ is the frequency of the m=1 mode magnon and $\Delta f$ is the smallest difference between the $f_{m=1}$ and the frequency of the phonon mode n from n=1 to 8. When Δf=0, η=1, which indicates a complete on-resonance condition. The phonon modes to which the eight frequency bands are corresponding are labeled.

FIG. 9A shows one embodiment of an optoelectronic transducer, which is described in detail in the Example. FIG. 9B shows the evolution of electric current $J_c(t)$ in the Pt layer of the freestanding membrane of the optoelectronic transducer of FIG. 9A. FIG. 9C shows the frequency spectrum of the electric current $J_c(t)$ in the Pt layer of the freestanding membrane of the optoelectronic transducer of FIG. 9A.

FIG. TOA shows the optoelectronic transducer of FIG. 9A with different membrane layer thicknesses.

DETAILED DESCRIPTION

Figure 1A:
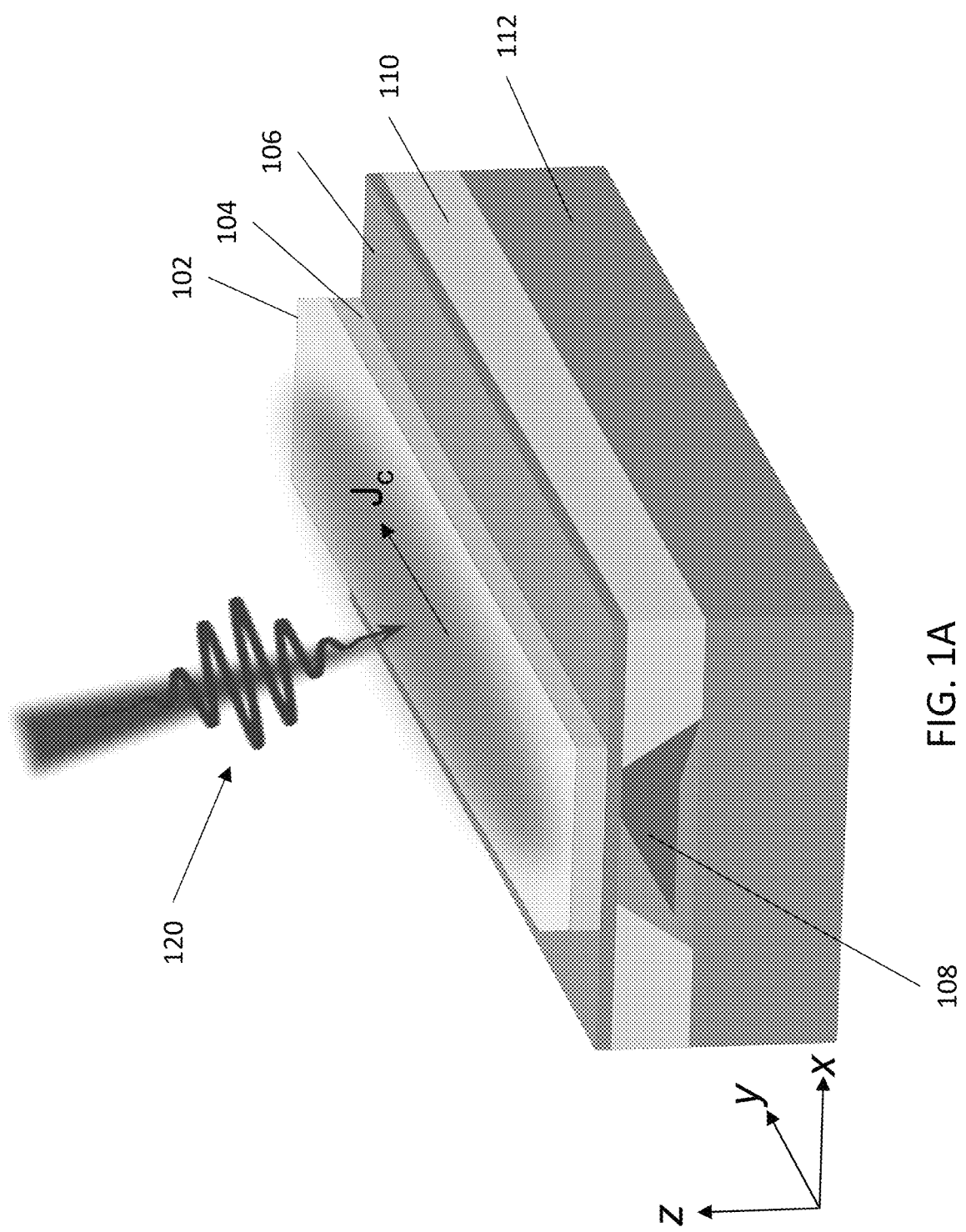
FIG. 1A shows a schematic, not to scale, of an optoelectronic transducer having a freestanding electrical conductor/magnetic-insulator/dielectric membrane integrated on a silicon substrate, where the electrical conductor works as an optical-to-acoustic transducer to convert a femtosecond (fs)-timescale laser pulse to a picosecond (ps)-timescale longitudinal acoustic pulse, and a substrate is a sink of the acoustic waves.

Optoelectronic transducers that convert a femtosecond (fs)-timescale laser pulse into a sinusoidal a.c. electrical current pulse with an extremely high frequency and a high quality factor (Q) are provided. The optoelectronic transducers are based on a trilayered freestanding membrane that functions as both an acoustic cavity and a magnon cavity.

One example of an optoelectronic transducer is shown in FIG. TA. In the optoelectronic transducer, the freestanding membrane includes an electrically conductive layer 102, a magnetic insulator layer 104, and a dielectric layer 106 arranged in a vertical stack. At least a portion of the trilayered membrane is suspended over an air gap 108 by a spacer 110. Because a portion of the membrane is suspended, the membrane is referred to herein as a freestanding membrane. The structure may be fabricated on a support substrate 112. The trilayered membrane, which has a nanoscale thickness, may be referred to as a nanomembrane. As used herein, the term nanoscale thickness refers to a thickness of less than 1000 nm; however, the trilayered membranes typically have thicknesses of 100 nm or less, including thicknesses of 50 nm or less.

During operation, a femtosecond (fs)-timescale laser pulse 120 is directed onto electrically conductive layer 102. This incident fs-timescale laser pulse is converted into a picosecond (ps)-timescale acoustic pulse by layer 102 via electron-phonon coupling and thermal expansion. The ps-timescale acoustic pulse (coherent acoustic phonons) excites coherent magnons (quanta of spin waves) in magnetic insulator layer 104 via phonon-magnon interaction. Then, the spin precession at the magnetic insulator side of the electrical conductor/magnetic insulator interface leads to the injection of a spin current ($J_s$) into layer 102, which is then converted into an in-plane charge current ($J_c$) (also referred to as an electrical current) in layer 102 via the inverse spin Hall effect (iSHE). The charge current pulse can be detected by a current detector.

In the optoelectronic transducers, the freestanding membrane serves as a cavity for confining multiple harmonic modes of acoustic phonons and magnons. This is illustrated schematically in FIGS. 1B and 1C. FIG. 1B is a cross-sectional view of a suspended trilayered membrane acting as an acoustic cavity for standing longitudinal acoustic phonons $\varepsilon_{zz}$ with different modes, n, while FIG. 1C shows the magnetic insulator 104 and electrically conductive 102 layers of the suspended membrane acting as a magnon cavity for standing magnons $\Delta m$ with modes of m.

The individual layer thicknesses in the freestanding membrane can be selected such that standing acoustic phonon modes and standing magnon modes have the same frequency, which is referred to as a resonance frequency. As a result of this frequency matching, the amplitude of the resonant magnon mode is resonantly enhanced by the confined phonon mode of the same frequency. Additionally, since the freestanding membrane serves as a cavity of both magnons and acoustic phonon, such resonant enhancement can last for an extended period of time (approximately the lifetime of the acoustic phonon) that goes far beyond the duration in a magnetic insulator thin film. Such combination of resonant excitation and cavity confinement leads to an exceptionally large magnon amplitude. The magnon modes that can be excited include higher-order magnon modes having intrinsic frequencies in the mmW and (sub)THz band.

Figures 1B, 1C:
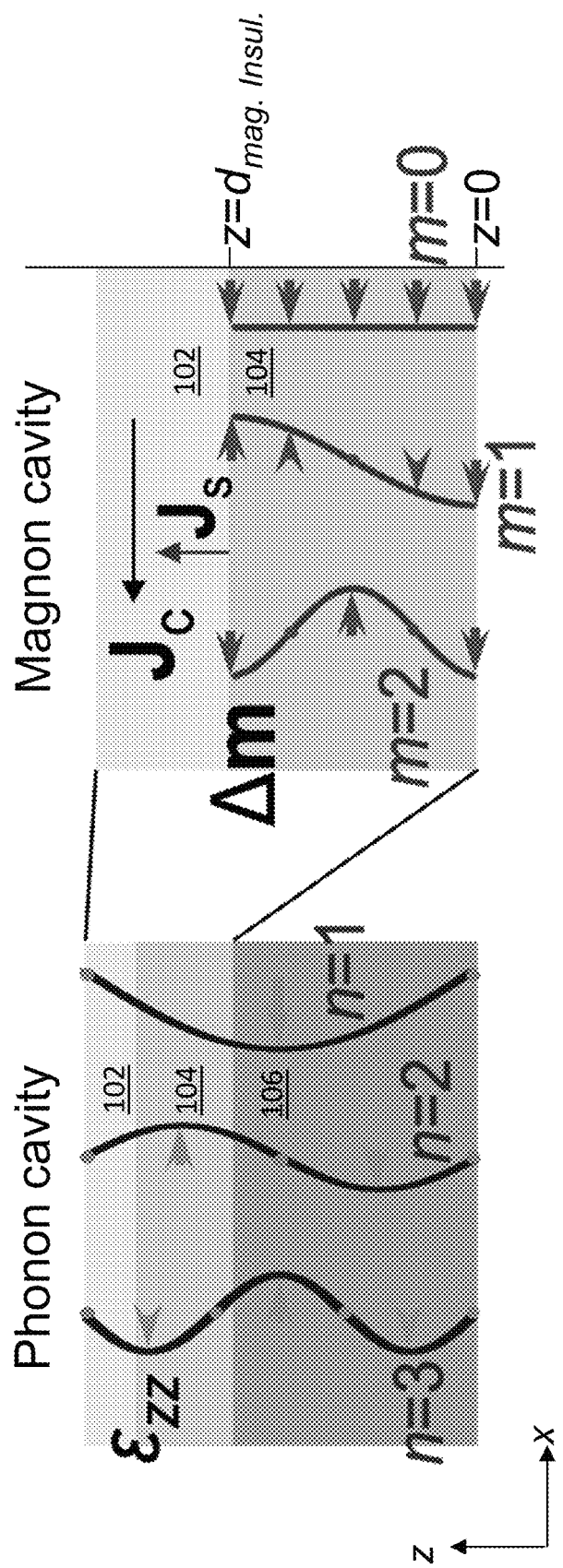
FIG. 1B is a schematic diagram of the trilayer membrane as a cavity for standing longitudinal acoustic phonons $\varepsilon_{zz}$ with mode n.
FIG. 1C is a schematic diagram of the magnetic insulator and electrically conductive layers where the magnetic layer acts as a cavity for standing magnons $\Delta m$ with modes of m. The electrically conductive layer also acts as a spin-to-charge current converter.
Figure 1D:
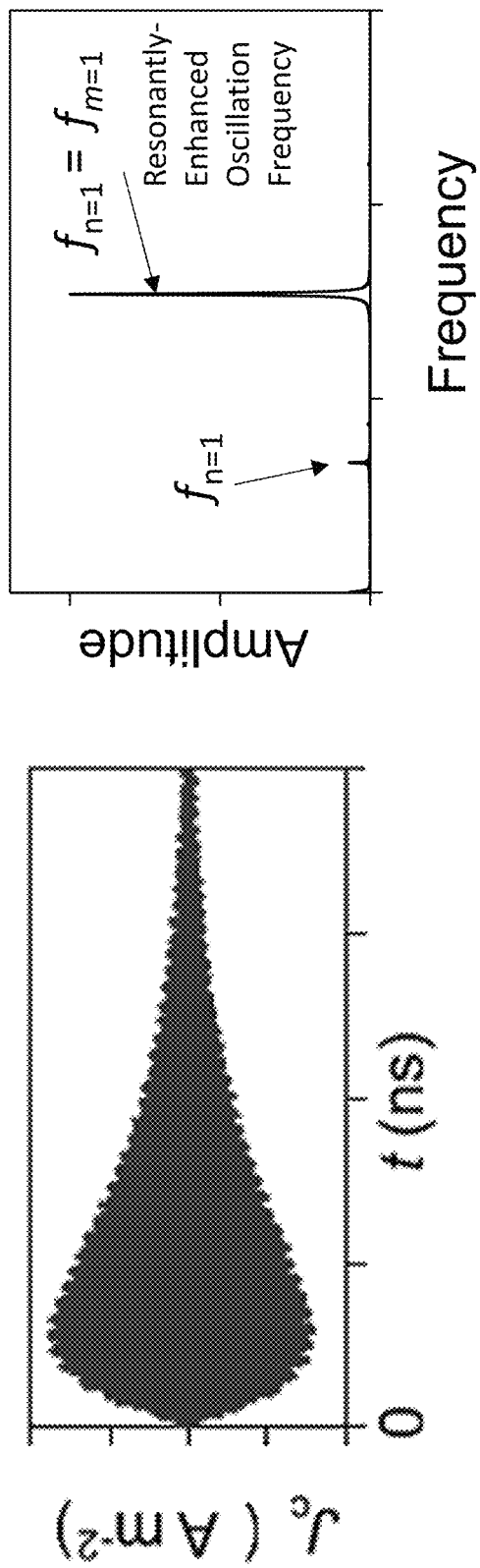
FIG. 1D (left panel) shows the temporal evolution of a generic charge current pulse generated in an electrically conductive layer of an optoelectronic transducer.

The temporal evolution of an oscillating charge current pulse generated in electrically conductive layer 102 by the injection of a spin current is illustrated in FIG. 1D (left panel). The charge current pulse has a characteristic shape in which the current ($J_c$) increases to a maximum before decreasing more gradually. Some embodiments of the optoelectronic transducers produce charge current pulses having ns-timescale lifetimes. (As used herein, the term ns-timescale refers to a duration of at least 0.1 ns. Ns-timescale pulses include, but are not limited to, those with durations of from 0.1 ns to 2 ns and those with durations of from 0.1 ns to 1 ns.) The lifetime of a current pulse can be measured by determining the peak amplitude over the entire temporal profile and finding the time, to, when the oscillation amplitude decreases to 1/e of the peak amplitude over the entire temporal profile. The to is the lifetime.

As shown in FIG. 1D (right panel), the frequency spectrum of the charge current pulse has peaks at oscillation frequencies corresponding to the frequencies of the acoustic phonon modes supported by the acoustic cavity. Notably, within the frequency spectrum, the amplitude of the oscillation frequency peak corresponding to the acoustic phonon/magnon resonance frequency is increased, relative to its amplitude in the absence of the phonon/magnon resonance. For the purposes of this disclosure, the oscillation frequency at which the charge current has this increased amplitude is said to be resonantly-enhanced and this resonantly-enhanced oscillating frequency can be used as an operating frequency of the optoelectronic transducer.

As discussed in more detail below, the resonantly-enhanced oscillation frequency of the charge current pulse can be tailored for a given application by the appropriate selection of the layer thicknesses in the freestanding membrane and can be modified by the application of an external magnetic field.

Figure 7:
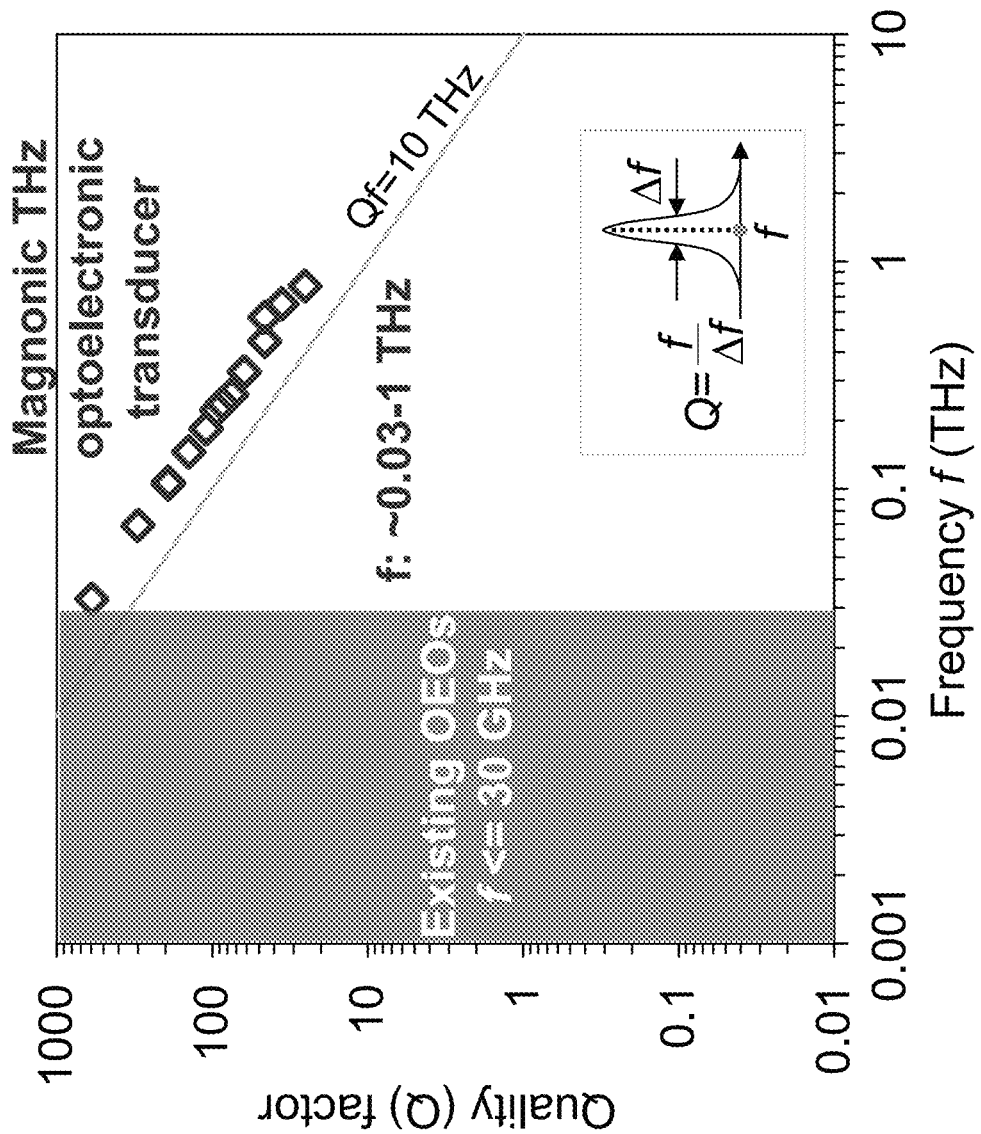
FIG. 7 compares the Quality Factors for the optoelectronic transducers described herein with conventional OEOs.

The ability to tailor the frequency of the ns-timescale charge current pulse by engineering the membrane layer thicknesses and by the application of an external magnetic field makes it possible to design optoelectronic transducers that produce oscillating ns-timescale a.c. electric pulses over a broad range of frequencies with high quality factors. For example, the optoelectronic transducers described herein can convert fs-timescale laser pulses into a.c. electrical current pulses with frequencies ranging from about 30 GHz to 1000 GHz (=1 THz) and a quality factor (Q) ranging from ~600 to ~20. For the purpose of this disclosure, the quality factor is defined as the operating frequency of the optoelectronic transducer (f) divided by the linewidth (full width half maximum) of the corresponding peak in the frequency spectrum, as illustrated in the inset of FIG. 7. These capabilities, which cannot be achieved with the photodiode used on conventional OEOs, enable the fabrication of THz optoelectrical transducers for high-data-rate, low-power wireless communications.

Figure 1E:
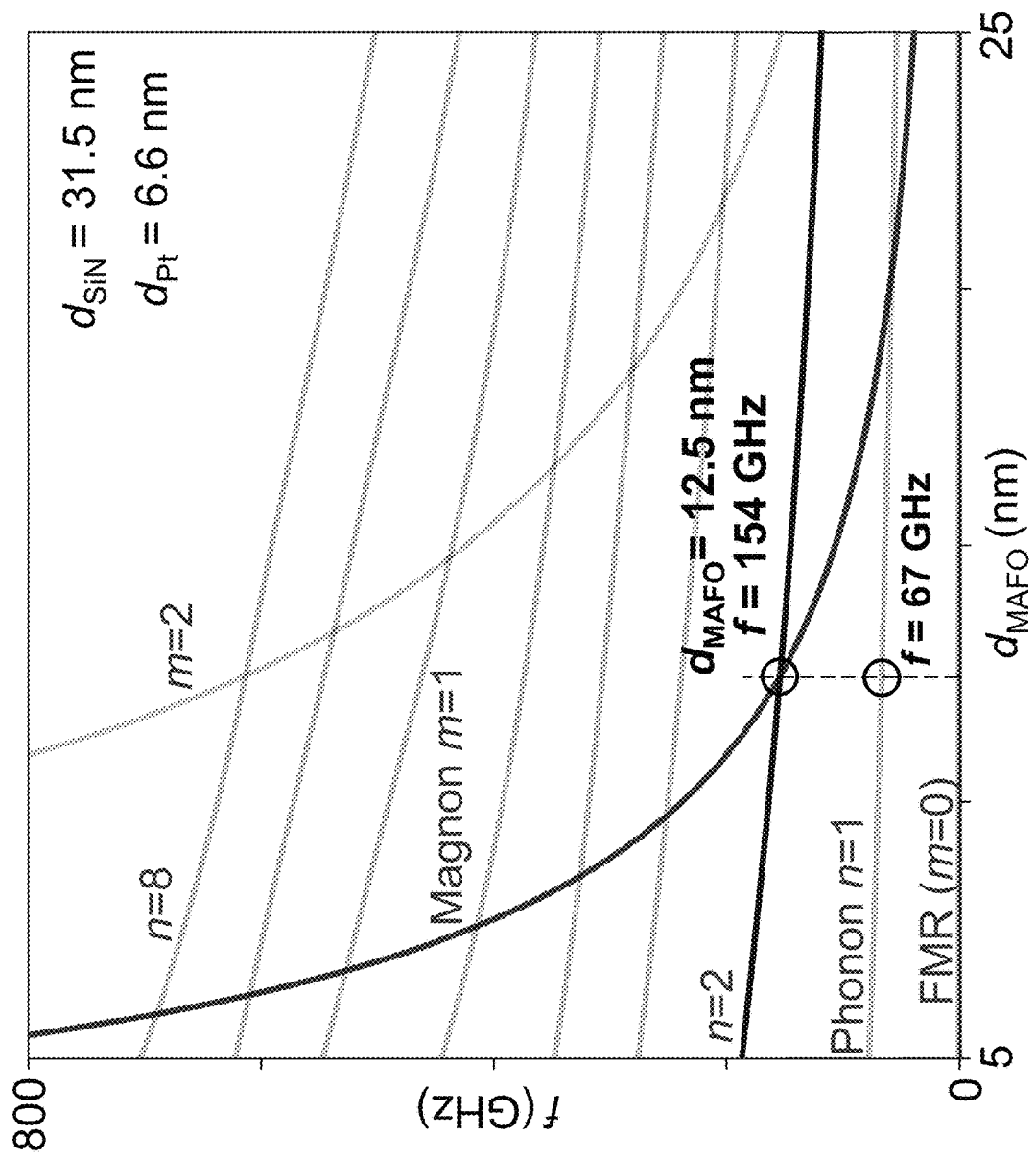
FIG. 1E shows analytically calculated frequencies of the standing magnon modes from m=0 to m=2 and the standing longitudinal acoustic phonon modes from n=1 to n=8, as functions of MAFO layer thickness $d_{MAFO}$.
Figure 1F:
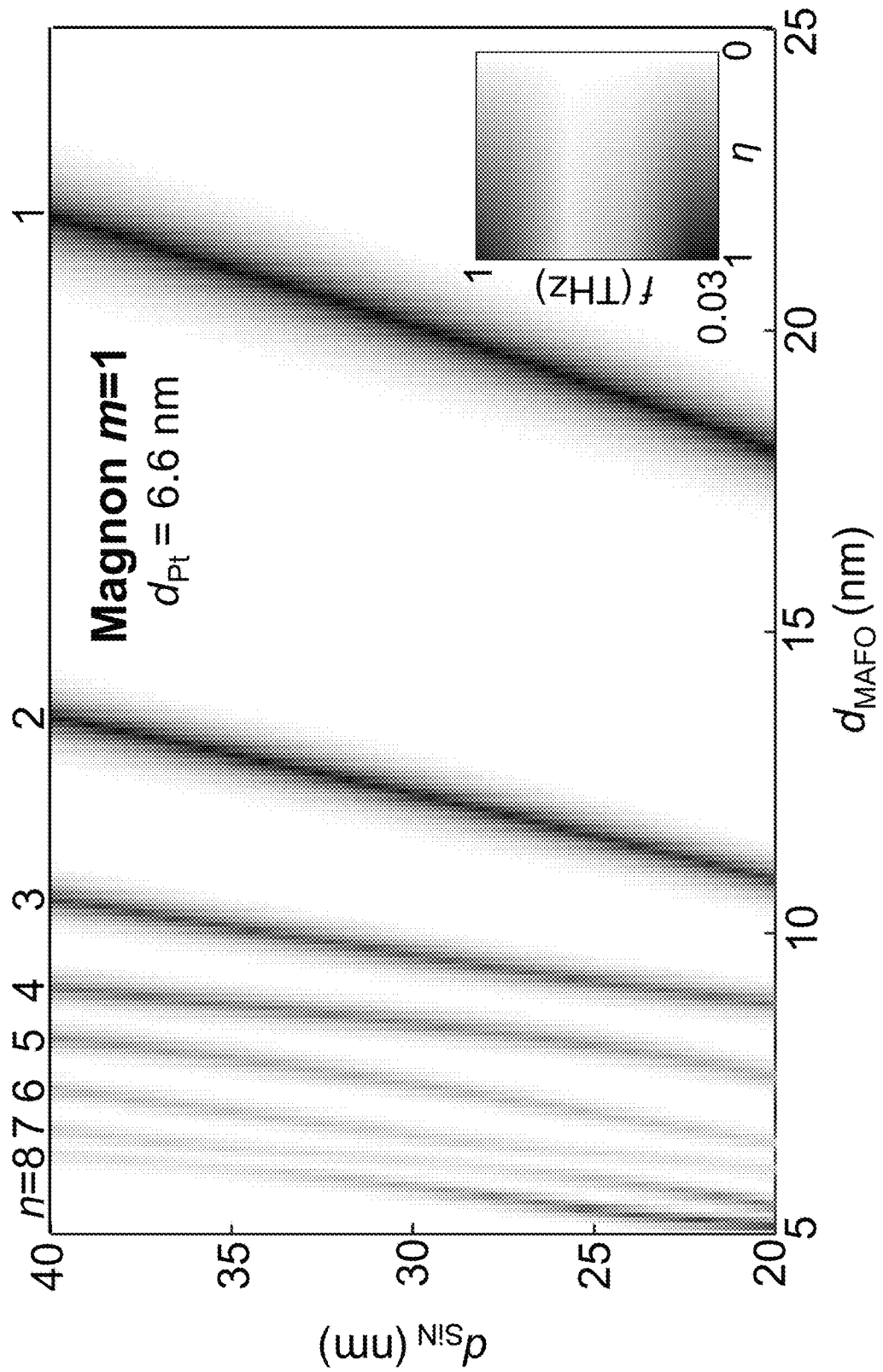
FIG. 1F shows analytically calculated frequencies of the resonant interaction between the standing acoustic phonons and the m=1 mode magnon as a function of both $d_{MAFO}$ and $d_{SiN}$. The shading gradient of $\eta$ is correlated to the degree of the resonance via a sigmoid function of $$\Delta f, \eta = 2 - \frac{2}{1 + \exp(-40|\Delta f|/f_{m-1})},$$

As noted above, the frequencies of the standing acoustic phonon modes and the standing magnon modes, as well as their resonant frequencies, will depend on the layer thicknesses in the freestanding membrane. This is illustrated in FIGS. 1E and 1F. FIG. 1E shows the frequencies of standing magnon modes from m=0 to m=2 and standing longitudinal acoustic phonon modes from n=1 to n=8 for a freestanding membrane composed of a platinum metal layer, an $MgAl_{0.5}Fe_{1.5}O_4$ (MAFO) magnetic insulator layer, and a silicon nitride dielectric layer. As shown in FIG. 1E, for a constant metal layer thickness ($d_{Pt}$) and dielectric layer thickness ($d_{SiN}$), the resonance condition where a given magnon mode, such as m=1, has the same frequency as a given acoustic phonon mode, such as n=2, will depend on the thickness of the magnetic insulator ($d_{MAFO}$). Therefore, one can achieve the enhancement of a magnon mode of a desired frequency by tailoring the thickness of the magnetic insulator layer to achieve resonance between the desired magnon mode and an acoustic phonon mode. In FIG. 1E, standing acoustic phonon mode n=2 and standing magnon mode m=1 have the same frequency (154 GHz) and resonantly interact with each other to enhance the magnitude of the m=1 mode at 154 GHz.

The selection of a desired resonance frequency is further tailored by the thickness of the dielectric layer in the freestanding membrane. FIG. 1F shows the frequencies of the resonant interactions between the standing acoustic phonon modes (n=1-8) and the m=1 magnon mode as a function of both the magnetic insulator layer thickness ($d_{MAFO}$) and the dielectric layer thickness ($d_{SiN}$). As shown in FIG. 1F, resonance between a magnon mode and an acoustic phonon mode is a function of both the dielectric and magnetic insulator layer thicknesses.

The workable and optimal layer thicknesses for the layers making up the freestanding membrane will depend on the materials being used and the desired charge current pulse frequencies. Generally, the individual layers in the trilayered membrane will have thicknesses in the range from about 2 nm to about 50 nm. However, the trilayered membranes are not limited to those having layer thicknesses in this range.

Figure 1G:
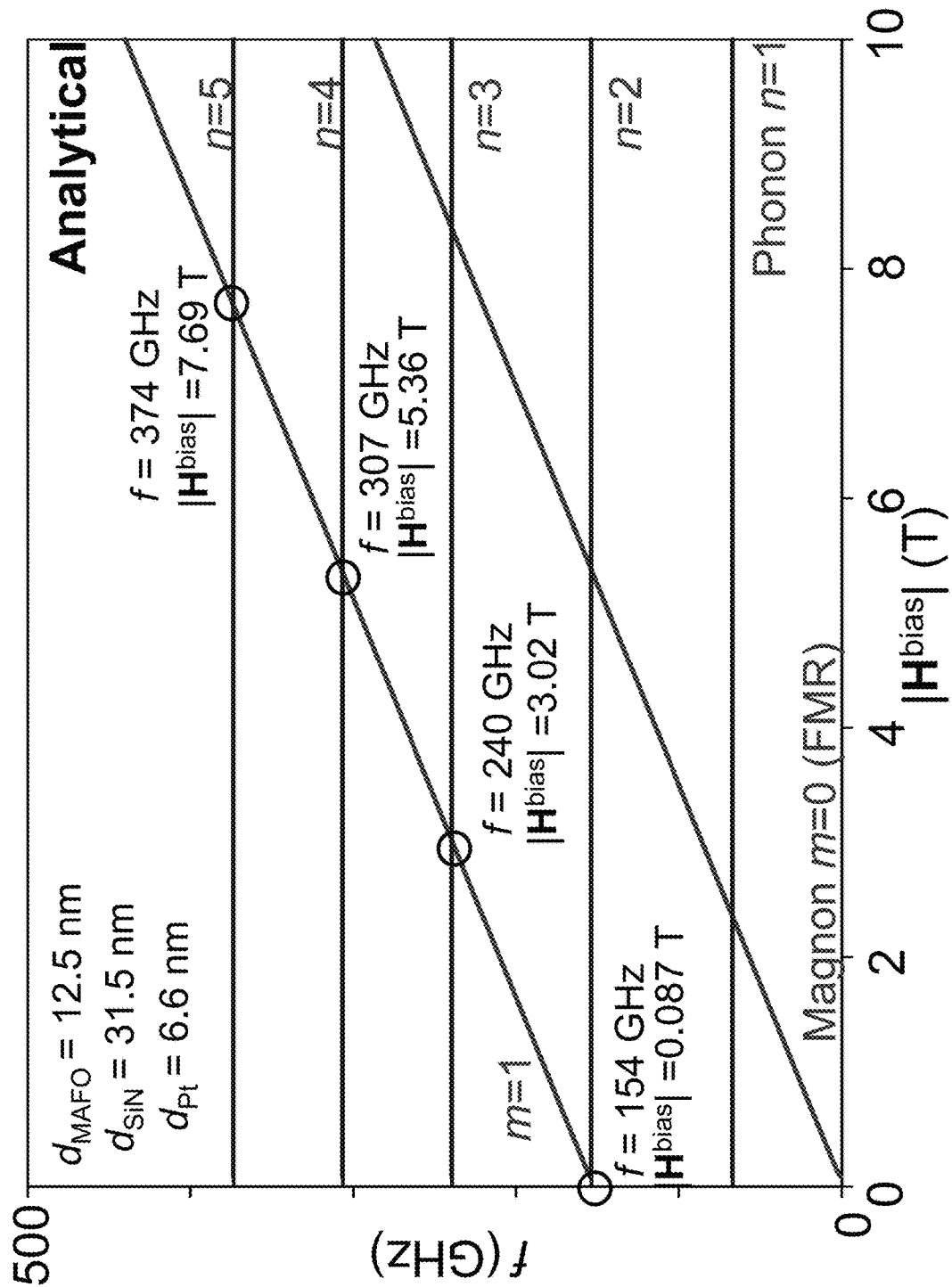
FIG. 1G shows analytically calculated frequencies of the m=0 and m=1 mode magnons as functions of bias magnetic fields $H^{bias}$, with the frequencies of the standing acoustic phonon modes from n=1 to n=5. The thicknesses of the individual layers are labeled. The $H^{bias}$ and the frequencies with which the magnons and phonons interact resonantly are labeled.

Dynamic in situ tuning of the frequency of a resonantly excited magnon mode can also be achieved by applying a tunable external magnetic field across the membrane, whereby the frequencies of the resonant magnon modes can be adjusted by adjusting the magnitude of the applied magnetic field. This is illustrated in FIG. 1G, which shows the frequencies of the m=1 mode magnon as a function of the magnitude of an applied bias magnetic field $|H^{bias}|$ for a $Pt/Si_3N_4/MAFO$ membrane. The magnetic-field-independent frequencies of the standing acoustic phonon modes n=1 to 5 are also shown. In FIG. 1G, for each magnitude, the direction of the magnetic field is configured to obtain an equilibrium magnetization 45° off the xy plane. However, other directions, including directions from greater than 0° to less than 90°, of the magnetic field can also be utilized. As shown in the figure, the m=1 mode magnon can be magnetically tuned to resonate with different acoustic phonon modes by increasing the magnetic field strength.

It should be noted that the materials used for the freestanding trilayered membranes in FIGS. 1E-1G are used for illustrative purposes only. The phonon and magnon mode curves for other material systems may differ quantitatively from those in FIGS. 1E-1G; however, the operating principles for optoelectronic transducers made with other electrically conductive materials, magnetic insulators, and dielectric materials will be the same. A detailed description of the process for generating frequency curves such as those shown in FIGS. 1E-1G is provided in the Example, and the approach used in the Example can be used as guidance for designing freestanding membranes that use other materials.

Electrically conductive layer 102 of the membrane can be made from various electrically conductive materials, provided that said materials are able to act as both an optical-to-acoustic pulse transducer and a spin-to-charge converter with sufficient efficiency to enable device operation. Examples of electrically conductive materials that can be used include metals, metal alloys, and conductive oxides. Additionally, the electrically conductive material should be non-magnetic so that the magnetic signal generated in the magnetic insulator layer can be confined to that layer. Examples of suitable pure metals include aluminum, copper, platinum, tungsten, iridium, ruthenium, palladium, chromium, silver, gold, iridium, bismuth, and tantalum (C. Bull, et al., APL Materials 9, 090701 (2021)). Examples of suitable alloys include CuIr, CuBi, and AgBi (Y. Niimi, et al., Reports on Progress in Physics 78, 124501 (2015)), and alloys of other pure metal elements. Examples of suitable conductive oxides include metallic rutile oxides, such as $IrO_2$, $OsO_2$, and $RuO_2$ (Y. Sun, et al., Physical Review B 95, 235104 (2017)). In some cases, the layer 102 can comprise a bilayer of two non-magnetic metals, in which the formation of a Rashba interface between the two non-magnetic metals results in a spin-to-charge current conversion with a higher conversion efficiency via the inverse Rashba-Edelstein effect (M. B. Jungfleisch, et al., Physical Review Letters 120, 207207 (2018)). The electrically conductive material may be single-crystalline or polycrystalline or amorphous, and it can be deposited on the magnetic insulator layer using known deposition methods, such as magnetron sputtering or electron beam (e-beam) evaporation followed by an anneal.

Magnetic insulator layer 104 is composed of a magnetic material having a sufficiently strong magnetoelastic coupling between spins and strains to generate spin waves (magnons) in the magnetic insulator. Magnetic insulator 104 is also an electrical insulator so that the current pulses generated in electrically conductive layer 102 are confined to that layer. The magnetic insulator layer is desirably a single-crystal layer and should also have sufficiently low magnetic damping to achieve magnon propagation and to support standing magnon modes in the membrane. MAFO is one example of a low-damping magnetic insulator with high magnetoelastic coupling properties. However, other magnetic insulators, such as yttrium-iron-garnet ($Y_3Fe_5O_{12}$; "YIG"), gadolinium-iron-garnet ($Gd_3Fe_5O_{12}$; "GdIG"), other rare-earth (R) iron garnets ($R_3Fe_5O_{12}$, "RIG"), and other spinel ferrites can also be used. Magnetic insulator layer 104 can be transferred onto dielectric layer 106 by growing the magnetic insulator layer on a sacrificial material followed by selective removal of the sacrificial material (e.g., via a selective etch). The released layer of the magnetic insulator can then be transferred onto the dielectric layer and bonded thereto. Remote epitaxy can also be used. In remote epitaxy, a layer of the magnetic material is grown epitaxially on an epitaxial growth substrate in the presence of a thin interlayer that creates an interface with weak adhesion between the epitaxial growth substrate and the magnetic insulator layer. Once the layer of magnetic insulator is grown, it can be exfoliated at the weak interface. The exfoliated (released) layer of magnetic insulator can then be transferred onto the dielectric layer and bonded thereto. By way of illustration, the remote epitaxy of MAFO can in principle be carried out using atomically thin (e.g., 1 or 2 monolayers) graphene (H. S. Kum, et al., Nature 578, 75-81(2020)) or other two-dimensional materials such as $MoS_2$ (C.-H. Ma, et al., APL Materials 9, 051115(2021)) and other transition metal dichalcogenides as the interlayer material and $MgAl_2O_4$ as the epitaxial growth substrate.

Dielectric layer 106 is composed of a non-magnetic, electrically insulating material. Because the dielectric material is not magnetic, the magnetic signal generated in the magnetic insulator layer can be confined to that layer. The dielectric layer is sufficiently elastically stiff to eliminate or limit damping of the acoustic waves and to support standing acoustic phonon modes in the membrane. By way of illustration, dielectric layers having an elastic stiffness coefficients in the range from 100 to 400 GPa may be used. However, dielectric materials whose elastic stiffness coefficients are outside of this range can also be used. It is also desirable for the dielectric material to have a good acoustic match with the magnetic insulator, so that the magnitude of an acoustic wave is not substantially reduced as it passes from dielectric layer 106 into magnetic insulator layer 104. Silicon nitrides ($Si_xN_y$), alumina ($AlO_x$), titanium oxide ($TiO_x$), and silicon oxide ($SiO_2$) are examples of elastically stiff dielectrics that can be used for dielectric layer 106. The dielectric layer can be formed over the air gap by direct growth on a thin spacer using known deposition method such as low-pressure chemical vapor deposition and sputtering, followed by back-etching of the spacer to create the air gap.

The materials of spacer 110 and substrate 112 are not particularly limited, provided that their electronic and magnetic properties do not interfere with the operation of the optoelectronic transducer. Silicon (Si) is one example of a suitable spacer and/or substrate material. The use of Si as a spacer and/or substrate may be advantageous because it allows for the integration of the transducers in silicon electronics. The ability to integrate the optoelectronic transducers on a silicon substrate is useful for system on-a-chip applications.

The fs-timescale pulse that activates the optoelectronic transducer is generated by a femtosecond laser that is optically coupled to the electrically conductive layer. For the purposes of this disclosure, a fs-timescale pulse is a pulse having a duration in the range from $1\times10^{-15}$ to $9\times10^{-13}$ seconds; for example, 1 fs to several hundred fs (in some embodiments, 1 fs to 500 fs). As used herein, the term optically coupled is used to mean that the femtosecond laser is positioned to direct fs-timescale laser pulses onto the electrically conductive layer, either directly or indirectly, using, for example, reflective surfaces or other optical components to steer the beam from the laser to the surface of the electrically conductive layer. Pulsed fs lasers are known and commercially available.

Figure 2:
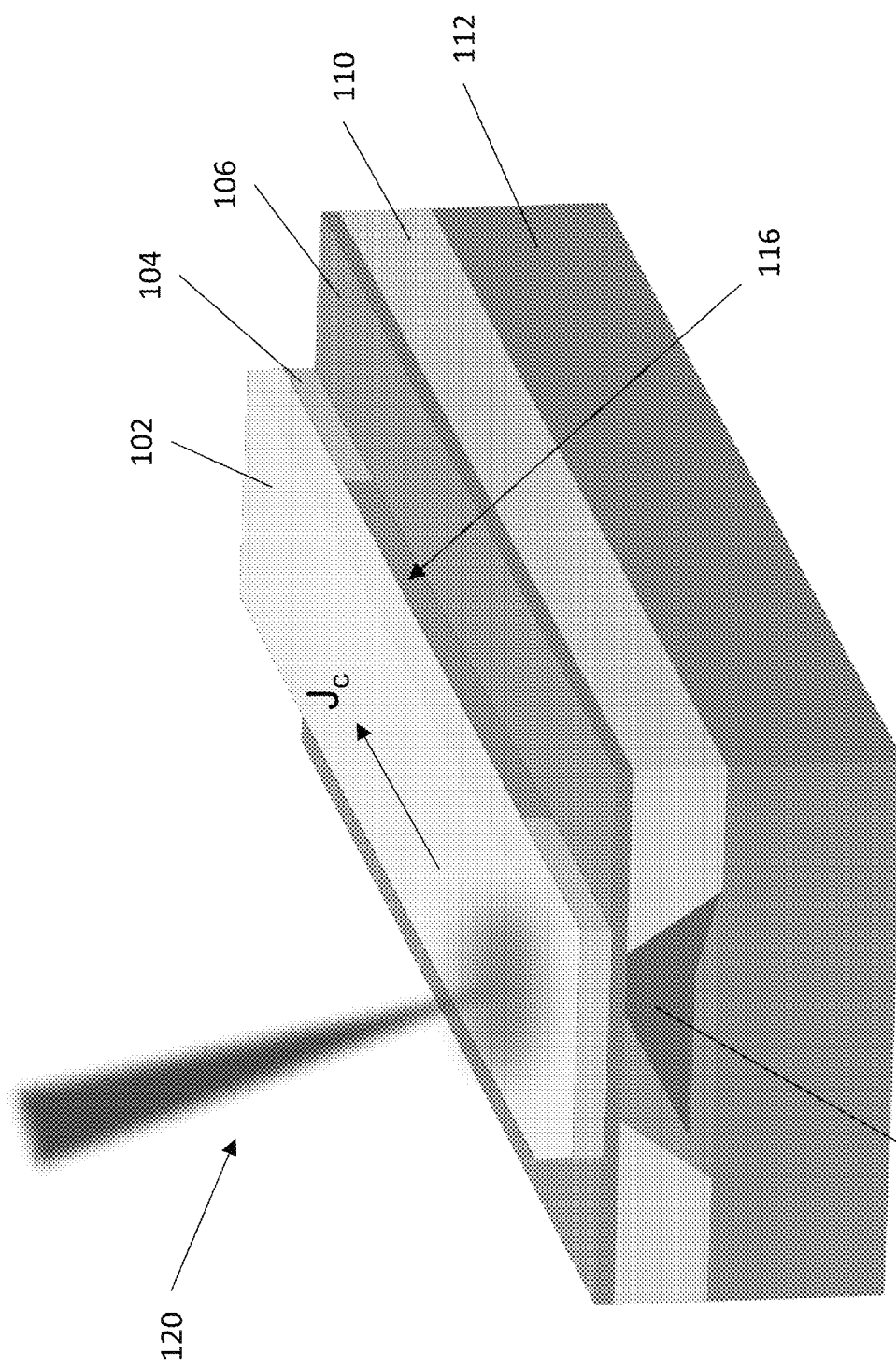
FIG. 2 shows a schematic of an optoelectronic transducer that includes a non-magnetic dielectric material disposed below a portion of its electrically conductive layer.

FIG. 1A shows one illustrative device geometry for an optoelectronic transducer. However, other embodiments and variations are possible. For example, as shown in FIG. 2, a non-magnetic dielectric material 116 may be disposed below a portion of electrically conductive layer 102. In this design, magnetic dielectric layer 104 is disposed below electrically conductive layer 102 in the area where the fs-timescale layer pulse 120 is incident on the electrically conductive material. Beyond this area, the magnetic insulator can be replaced by non-magnetic dielectric material 116. This design helps to ensure that the charge current pulse ($J_c$) is generated locally in the electrically conductive layer and that the charge current flows only in the electrically conductive layer. The non-magnetic dielectric material can also serve as a mechanical support for the electrically conductive layer. Examples of suitable non-magnetic dielectric materials include silicon nitrides ($Si_xN_y$), alumina ($AlO_x$), titanium oxide ($TiO_x$) and silicon oxide ($SiO_2$). Additionally, the non-magnetic dielectric material 116 does not necessarily need to be bonded to the magnetic insulator 104.

Figure 3A:
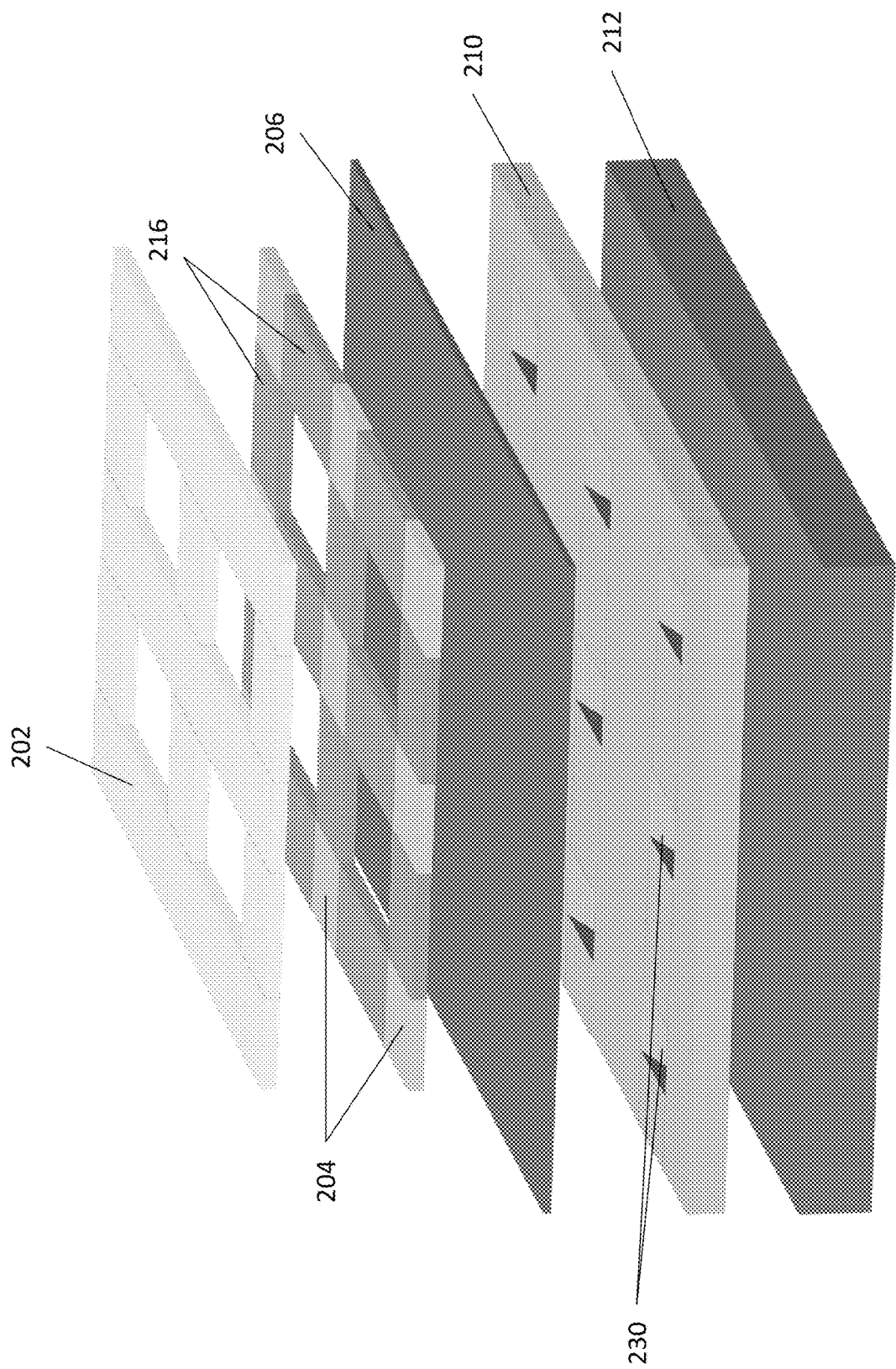
FIGS. 3A-3B show exploded views of optoelectronic transducer arrays in which the air gaps are formed by pits in the spacer (FIG. 3A) or trenches in the spacer (FIG. 3B).
Figure 3B:
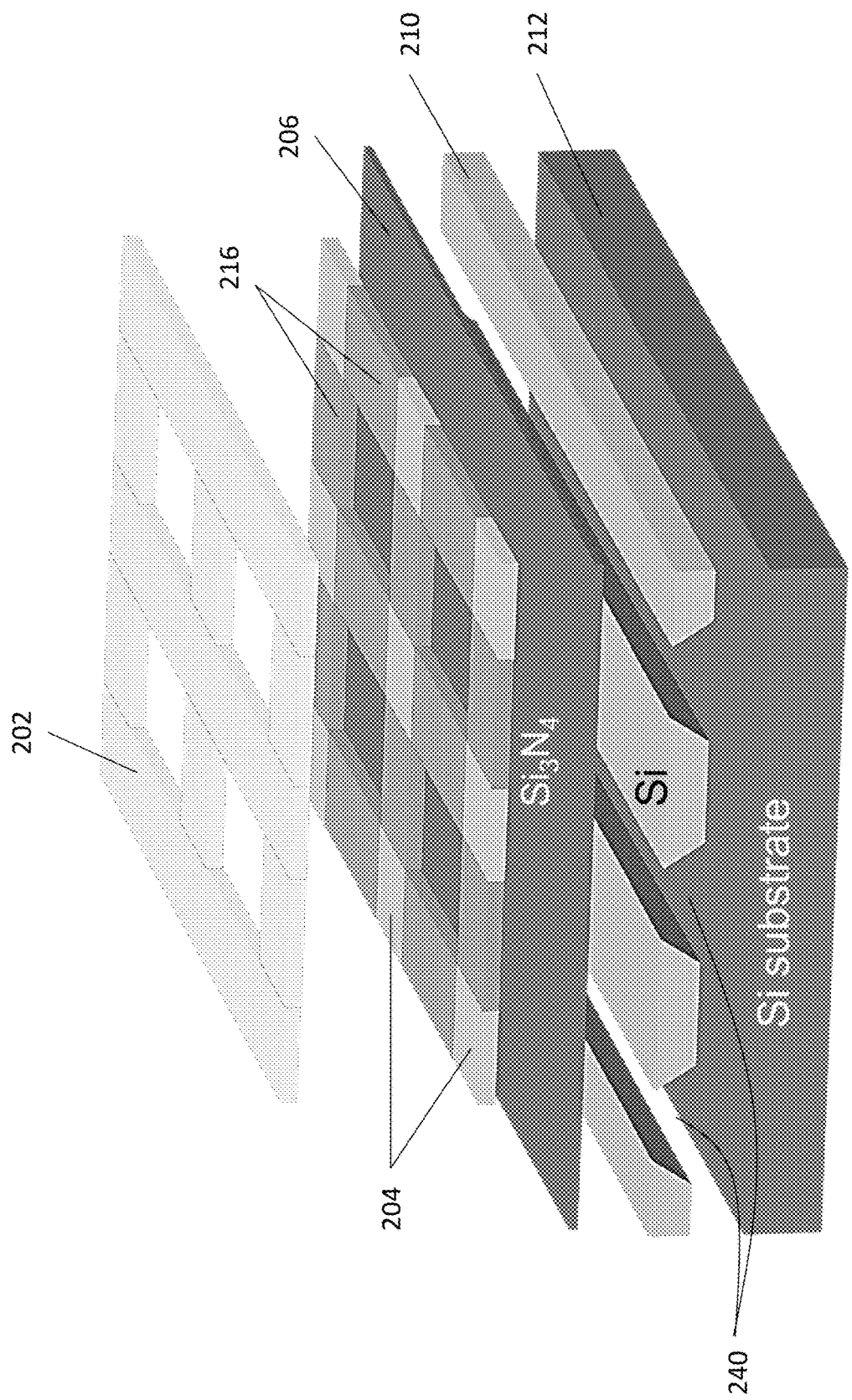

The optoelectronic transducers can be fabricated as single stand-alone devices or can be incorporated into an array comprising a plurality of optoelectronic transducers. This is illustrated in FIGS. 3A and 3B, which show exploded views of optoelectronic transducer arrays. The arrays can, optionally, share a common layer of dielectric material 206, a common spacer 210, and/or a common substrate 212. In the embodiments of the optoelectronic transducer arrays of FIGS. 3A and 3B, the magnetic insulator layers 204 are laid out in a grid and separated by layers of non-magnetic dielectric material 216, and the layer of electrically conductive 202 spans the magnetic insulator layer 204 of multiple transducers in the array. Likewise, the non-magnetic dielectric material 216 does not necessarily need to be bonded to the magnetic insulator 204. The air gaps over which the trilayered membrane of each transducer is suspended can be provided by, for example, pits 230 defined in spacer 210 (FIG. 3A) or trenches 240 through spacer 210 (FIG. 3B). If the air gaps are provided by pits that do not extend completely through spacer 210, the spacer itself can serve as a substrate and substrate 212 may be omitted.

Figure 3C:
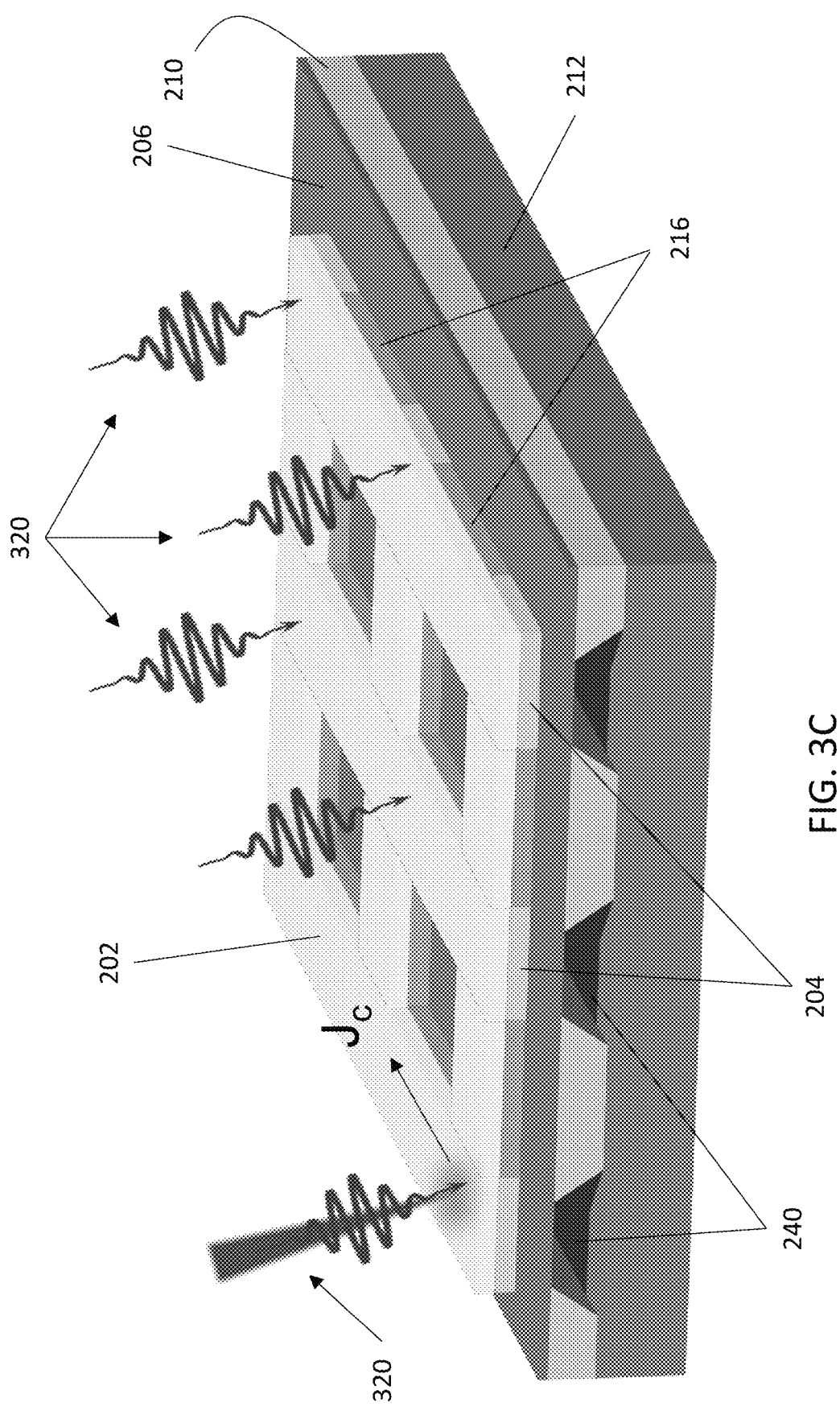
FIG. 3C shows the optoelectronic transducer array of FIG. 3B with multiple incident laser pulses triggering different optical transducers.
Figure 3D:
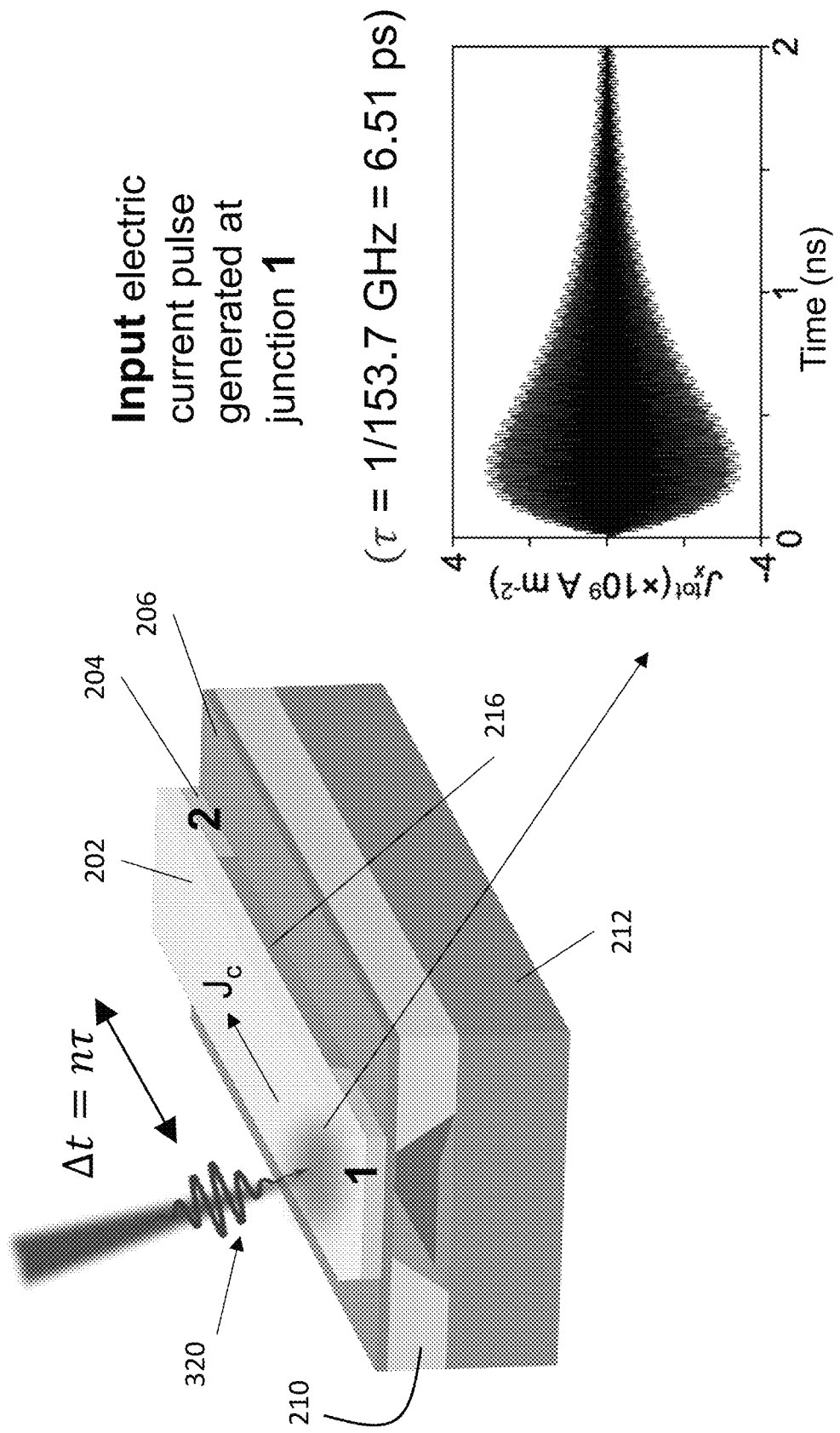
FIG. 3D shows an optoelectronic device having two optoelectronic transducers (1 and 2) (left panel) and the temporal evolution of an in-plane electrical current pulse generated in the electrically conductive layer of the first optoelectronic transducer (right panel).
Figure 3E:
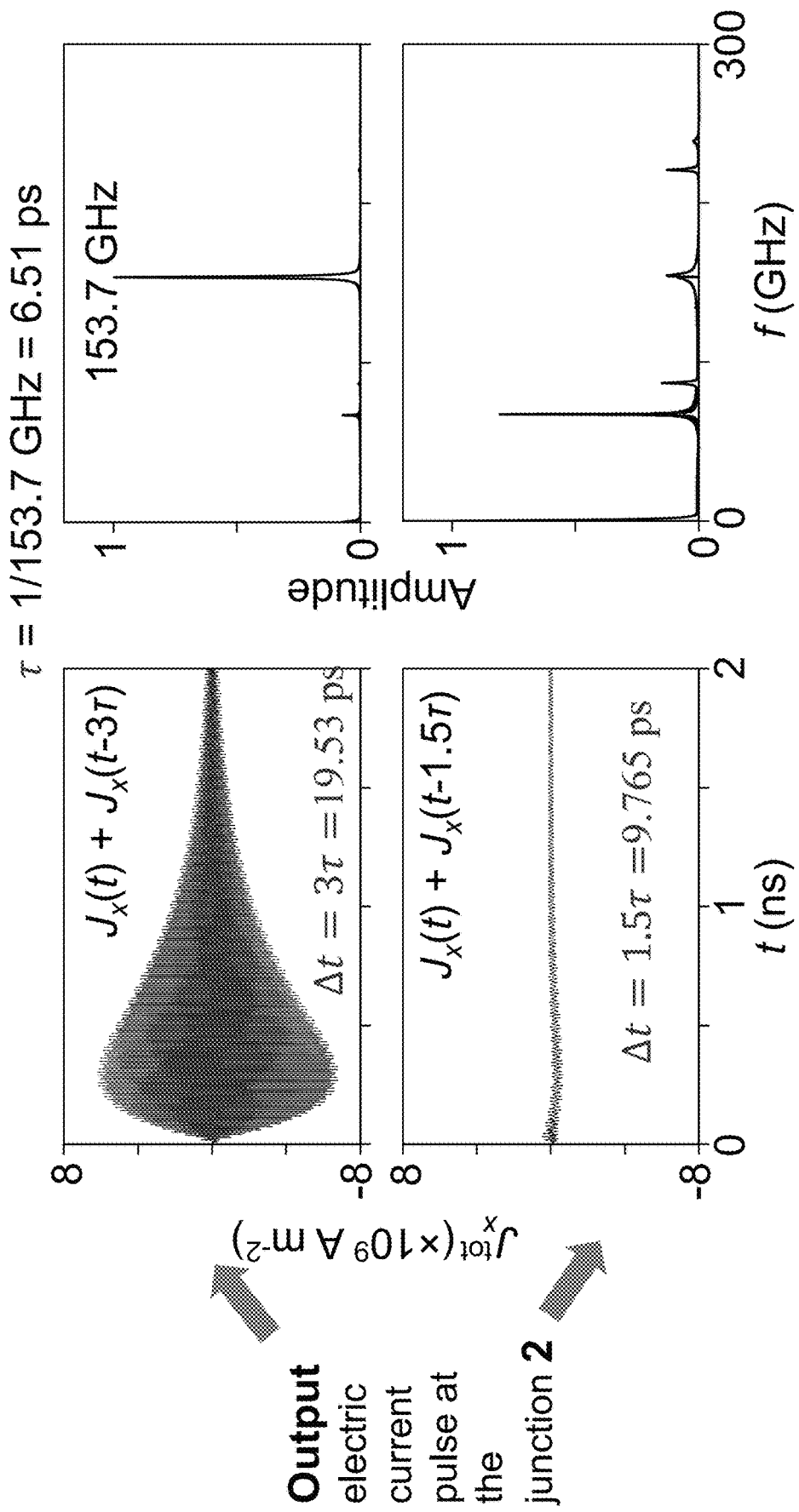
FIG. 3E (top panels) shows the effect on the charge current pulse amplitude (top left) and frequency spectrum (top right) of constructive interference between charge current pulses generated by the two optoelectronic transducers of FIG. 3D and (bottom panels) the effect on the charge current pulse amplitude (bottom left) and frequency spectrum (bottom right) of destructive interference between charge current pulses generated by the two optoelectronic transducers of FIG. 3D.

Multiple optoelectronic transducers may be operated independently to produce independent electrical current pulses. Alternatively, two or more optoelectronic transducers may operate together to modulate the magnitude of electrical current pulses in the electrically conductive layer, as shown in FIGS. 3C-3E. FIG. 3C shows the array of optoelectronic transducers of FIG. 3B in a non-exploded view with fs-timescale laser pulses 320 locally exciting different optoelectronic transducers in an array. (Laser pulses 320 can be generated by the same laser or by two of more lasers.) Focusing on two optoelectronic transducers in an array, FIG. 3D shows how the arrival times of different laser pulses on the optoelectronic transducers can be used to modulate a charge current pulse in the electrically conductive material. Based on the principles of operation discussed herein, when a first fs-timescale laser pulse 320 impinges on electrically conductive layer 202 of the first optoelectronic transducer (at junction "1" in FIG. 3D, left panel), a first in-plane electric current pulse (FIG. 3D, right panel) is produced in the electrically conductive layer. In this case, the current pulse has an amplified resonance frequency at 153.7 GHz and period ($\tau$) of 6.51 ps. A second fs-timescale laser pulse can then be directed onto the electrically conductive layer of the second optoelectronic transducer (at junction "2" in FIG. 3D, left panel) after some time delay ($\Delta t$), causing a second in-plane electric pulse to be generated. By adjusting the timing of the second fs-timescale laser pulse, the magnitude of the electrical current in the electrically conductive material can be increased or decreased by the interaction of the first and second electrical pulses. Specifically, by delaying the second fs-timescale laser pulse by an integer (n) number of periods ($\tau$), constructive interference can be achieved and the magnitude of the electric pulse at the resonance frequency (153.7 GHz) can be increased—ideally doubled (FIG. 3E, top panels). Alternatively, by delaying the second fs-timescale laser pulse by a half integer (n/2) number of periods ($\tau$), destructive interference can be achieved and the magnitude of the electric pulse at the resonance frequency (153.7 GHz) can be decreased, thereby effectively blocking that electrical signal in the electrically conductive layer (FIG. 3E, bottom panels). Note that the charge current shown in FIG. 3E is obtained under the assumption that the electric pulse generated at junction "1" flows to junction "2" instantaneously. This assumption is acceptable when the distance between the two junctions is sufficiently short and/or the electron mobility is sufficiently large.

In should be noted that in FIGS. 3D and 3E, Pt, MAFO, $Si_3N_4$, and Si are used for the electrical conductor, magnetic insulator, dielectric, and spacer/substrate, respectively. However, these materials are used for illustrative purposes only. Optoelectronic arrays based on the same operating principles can be fabricated from other materials.

Example

This Example illustrates, based on analytical calculation and dynamical phase-field simulations, a freestanding heavy-metal/magnetic-insulator/dielectric membrane (of the design shown in FIG. TA), which can be integrated on a silicon (Si) substrate and enable the formation and confinement of both a standing acoustic phonon and magnons, as schematically shown in FIGS. 1B and 1C. Here, the wavenumbers of the phonon ($k_n$) and magnon ($k_m$) both take a series of discrete values with different harmonic modes (n, m=0, 1, 2, ... $\infty$). The heavy-metal layer functions as both an optical-to-acoustic transducer to convert the femtosecond (fs) laser pulse into aps acoustic pulse and a spin-charge converter to convert the pumped spin current to a charge current via the inverse spin Hall effect (iSHE).

A freestanding $Pt/(001)MgAl_{0.5}Fe_{1.5}O_4(MAFO)/Si_3N_4$ membrane was used as an illustrative example, where the elastically stiff $Si_3N_4$ membrane can provide mechanical support for the relatively thin MAFO/Pt bilayer. The (001) MAFO film was considered because it simultaneously has a large magnetoelastic coupling coefficient ($B_1 \sim 1.2$ MJ m$^{-3}$) and a low Gilbert magnetic damping ($\alpha \sim 0.0015$) according to literature (S. Emori, et al., Nano Lett. 18, 4273-4278 (2018).) Moreover, a large spin Hall angle ($\theta_{Pt} \sim 0.83$) has previously been measured for the Pt film in the MAFO/Pt bilayer. (P. Li, et al., Phys. Rev. Mater. 5, 64404 (2021).) Due to the cavity-enhanced resonant magnon-phonon interaction, the simulations described herein show that this freestanding trilayer membrane permits converting a fs laser pulse to a nanosecond (ns)-long a.c. electrical current pulse with a frequency ranging from ~30 GHz to 1 THz and a high-quality factor (Q) from ~600 to ~20. Compared to a reference heterostructure with Pt/MAFO bilayer film on a $Si_3N_4$ substrate, dynamical phase-field simulations predict a 12-fold enhancement in the real-space amplitude of the desirable m=1 mode THz magnon as well as a lifetime extension from ~190 ps to ~970 ps. Furthermore, this Example demonstrates that the frequency of the resonantly excited m=1 mode magnon can be dynamically tuned by applying an in situ external magnetic field.

Analytical Theory of Standing Phonons and Magnons

By solving a set of linearized elastodynamic equations under appropriate boundary conditions (see details in Supplemental Material 1), an analytical formula was derived for the frequencies of the standing acoustic phonon modes in a freestanding Pt/MAFO/Si$_3$N$_4$ membrane as a function of the thickness of the individual layers, given by, $$c_{Pt}c_{SiN}\left(-1+e^{\frac{2id_{Pt}\omega}{v_{Pt}}}\right)\left(-1+e^{\frac{2id_{MAFO}\omega}{v_{MAFO}}}\right)\left(-1+e^{\frac{2id_{SiN}\omega}{v_{SiN}}}\right)v_{MAFO}^2 + \quad (1)$$

$$c_{MAFO}^2\left(1+e^{\frac{2id_{Pt}\omega}{v_{Pt}}}\right)\left(-1+e^{\frac{2id_{MAFO}\omega}{v_{MAFO}}}\right)\left(1+e^{\frac{2id_{SiN}\omega}{v_{SiN}}}\right)v_{Pt}v_{SiN} + $$

$$c_{MAFO}c_{SiN}\left(1+e^{\frac{2id_{Pt}\omega}{v_{Pt}}}\right)\left(1+e^{\frac{2id_{MAFO}\omega}{v_{MAFO}}}\right)\left(-1+e^{\frac{2id_{SiN}\omega}{v_{SiN}}}\right)v_{p}v_{MFO} + $$

$$c_{Pt}c_{MAFO}\left(-1+e^{\frac{2id_{Pt}\omega}{v_{Pt}}}\right)\left(1+e^{\frac{2id_{MAFO}\omega}{v_{MAFO}}}\right)\left(1+e^{\frac{2id_{SiN}\omega}{v_{SiN}}}\right)v_{MAFO}v_{SiN} = 0,$$

where $d_x$, $c_x$, and $v_x$ (x=Pt, MAFO, SiN) refer to the thickness, elastic stiffness component $c_{11}$, and longitudinal sound speed of the individual layer, respectively; $\omega$ is the angular frequency of the phonon. The solutions $f=\omega/2\pi$ can be found numerically. Skipping the solution of f=0, the first nontrivial solution that is larger than 0 is the frequency of the standing acoustic phonon mode of n=1, and so forth for n=2, 3, . . . ∞.

The analytical formula for the standing exchange magnons was derived in a previous publication, $$f = \frac{\gamma}{2\pi}\sqrt{D^2k_m^4 + \Omega D k_m^2 - \Lambda}$$

and the angular wavenumber $k_m=m\pi/d_{MAFO}$ (m=0, 1, 2, . . . ∞) of the magnon modes is related to the MAFO layer thickness $d_{MAFO}$. (S. Zhuang and J.-M. Hu, npj Comput. Mater. 8, 167 (2022).) The exchange stiffness is $$D = \frac{2A_{ex}}{\mu_0 M_s}$$

with $A_{ex}$ being the exchange coupling coefficient and $M_s$ being the saturation magnetization; $\gamma$ is the gyromagnetic ratio and $\mu_0$ is the vacuum permeability; $\Omega$ and $\Lambda$ are functions of the magnetization and bias magnetic field, etc., whose expressions are detailed in Supplemental Material 2. FIG. 1E shows the frequencies of the standing acoustic phonons and magnons as a function of the MAFO layer thickness ($d_{MAFO}$), where the $d_{Pt}$ and $d_{SiN}$ are fixed at 6.6 nm and 31.5 nm, respectively. As seen, the standing acoustic phonon modes and the standing magnon modes would have the same frequency under some specific values of $d_{MAFO}$. For example, when $d_{MAFO}$=12.5 nm, both the phonon mode n=2 and the magnon mode m=1 have the frequency of 154 GHz. In such cases, the resonant magnon-phonon interaction would enhance the amplitude of the magnon mode, which will be demonstrated using numerical simulations below. Fixing the Pt layer thickness to be 6.6 nm, FIG. 1F shows the map of the $d_{MAFO}$ and $d_{SiN}$ values that lead to resonant interaction between the standing acoustic phonon and the m=1 mode standing magnon over the frequency range from 30 GHz to 1 THz. As shown, the map has 8 bands along the axis of $d_{MAFO}$, corresponding to standing phonon modes from n=1 to 8, respectively. To achieve resonant magnon-phonon interaction at higher frequencies, higher-order acoustic phonon modes need to be utilized, which requires the injected acoustic pulse to cover higher frequencies in its frequency window, but higher-frequency acoustic oscillations and hence the acoustically driven magnons are damped more quickly due to the intrinsic elastic loss.

Dynamical Phase-Field Simulations

The analytical calculation provides guidance for the selection of individual layer thicknesses to resonantly excite a standing exchange magnon mode of desirable frequency by a standing acoustic phonon mode of the same frequency. To predict the amplitudes and durations of the acoustically excited THz magnon modes, a dynamical phase-field model was employed that incorporates the coupled dynamics of acoustic phonons, magnons, photons, and plasmons in magnetic multilayer heterostructures. (S. Zhuang and J.-M. Hu, 2022.) Specifically, the phase-field model incorporates the secondary acoustic waves generated from the acoustically excited precession of local magnetization via the magnetoelastic stress. The model also incorporates the backaction of the electromagnetic (EM) waves (photons) that originate from both the precessing magnetization in the MAFO (via the magnetic dipole radiation) and the electric current in the Pt (via the electric dipole radiation): the magnetic-field component of the EM wave will influence the magnetization dynamics while the electric-field component of the EM wave will induce eddy current in the Pt. Such backactions are necessary to consider for achieving an accurate simulation of the charge current in the Pt layer and the EM radiation in the free space.

In the dynamical phase-field model, the Landau-Lifshitz-Gilbert (LLG) equation is used to describe the temporal evolution of the normalized magnetization m in the MAFO, $$\frac{\partial m}{\partial t} = -\frac{\gamma}{1+\alpha^2}m \times H^{eff} - \frac{\alpha\gamma}{1+\alpha^2}m\times(m\times H^{eff}), \quad (2)$$

where $\alpha$ is an effective magnetic damping coefficient. The total effective magnetic field $H^{eff}=H^{anis}+H^{exch}+H^{dip}+H^{bias}+H^{mel}+H^{EM}$ is a sum of the magnetocrystalline anisotropy field $H^{anis}$, the magnetic exchange coupling field $H^{exch}$, the magnetic dipolar coupling field $H^{dip}$, the bias magnetic field $H^{bias}$, the magnetoelastic field $H^{mel}$ and the magnetic field component $H^{EM}$ of the EM wave. The mathematical expressions of the $H^{anis}$ and the $H^{dip}$ (both are a function of m), the $H^{exch}$ (a function of $\nabla^2 m$), and the $H^{mel}$ (a function of m and local strain z) are provided in a previous work. (S. Zhuang and J.-M. Hu, 2022.) In this example, the $H^{bias}$ was applied to lift the magnetizations off the xy plane by 45° before acoustic excitation, so that the torque exerted by the $H^{mel}$ on the m was maximized.

The local strain ε above is calculated as $$\varepsilon_{ij} = \frac{1}{2}\left(\frac{\partial u_i}{\partial j} + \frac{\partial u_j}{\partial i}\right)(i, j = x, y, z)$$

and the evolution of the mechanical displacement u is governed by the elastodynamics equation, $$\rho\frac{\partial^2 u}{\partial t^2} = \nabla\cdot\left(\sigma + \beta\frac{\partial\sigma}{\partial t}\right), \quad (3)$$

where stress $\sigma=c(\varepsilon-\varepsilon^0)$; $\rho$, $\beta$ and c are the phase-dependent mass density, stiffness damping coefficient, and elastic stiffness, respectively. The $\varepsilon^0$ is a stress-free strain that describes the backaction of the magnetization via magnetostriction, and $$\varepsilon_{ii}^0 = \frac{3}{2}\lambda_{100}^M\left(m_i^2 - \frac{1}{3}\right), \varepsilon_{ij}^0 = \frac{3}{2}\lambda_{111}^M m_i m_j,$$

with i, j=x, y, z, where $\lambda_{100}^M$ and $\lambda_{111}^M$ are the magnetostrictive coefficients of the MAFO.

The dynamics of the EM wave is described by Maxwell's equations, and the two governing equations for the magnetic and electric field components are listed below, $$\nabla \times E^{EM} = -\mu_0\left(\frac{\partial H^{EM}}{\partial t} + \frac{\partial M}{\partial t}\right), \quad (4)$$

$$\nabla \times H^{EM} = \varepsilon_0\varepsilon_r\frac{\partial E^{EM}}{\partial t} + J^p + J^f, \quad (5)$$

where $E^{EM}$ is the electric field component of the EM wave; $M=M_s m$ is the local magnetization in MAFO, and m is obtained by solving the LLG equation (Eq. 2); $\varepsilon_0$ and $\varepsilon_r$ are vacuum and relative permittivity, respectively; $J^f$ and $J^p$ are the free charge current density and polarization current density, respectively, in the Pt. $J^p$ is induced by the electric field $E^{EM}$ in dispersive medium such as the metallic Pt, which results in the absorption and reflection of the EM wave. Its dynamics is obtained by solving the time-dependent differential equation based on the Drude model, $$\frac{\partial J^p}{\partial t} + \tau^{-1}J^p = \varepsilon_0\omega_p^2 E^{EM}, \quad (6)$$

where $\omega_p$ and $\tau$ are the plasma frequency and electron relaxation time, respectively.

Figure 8:
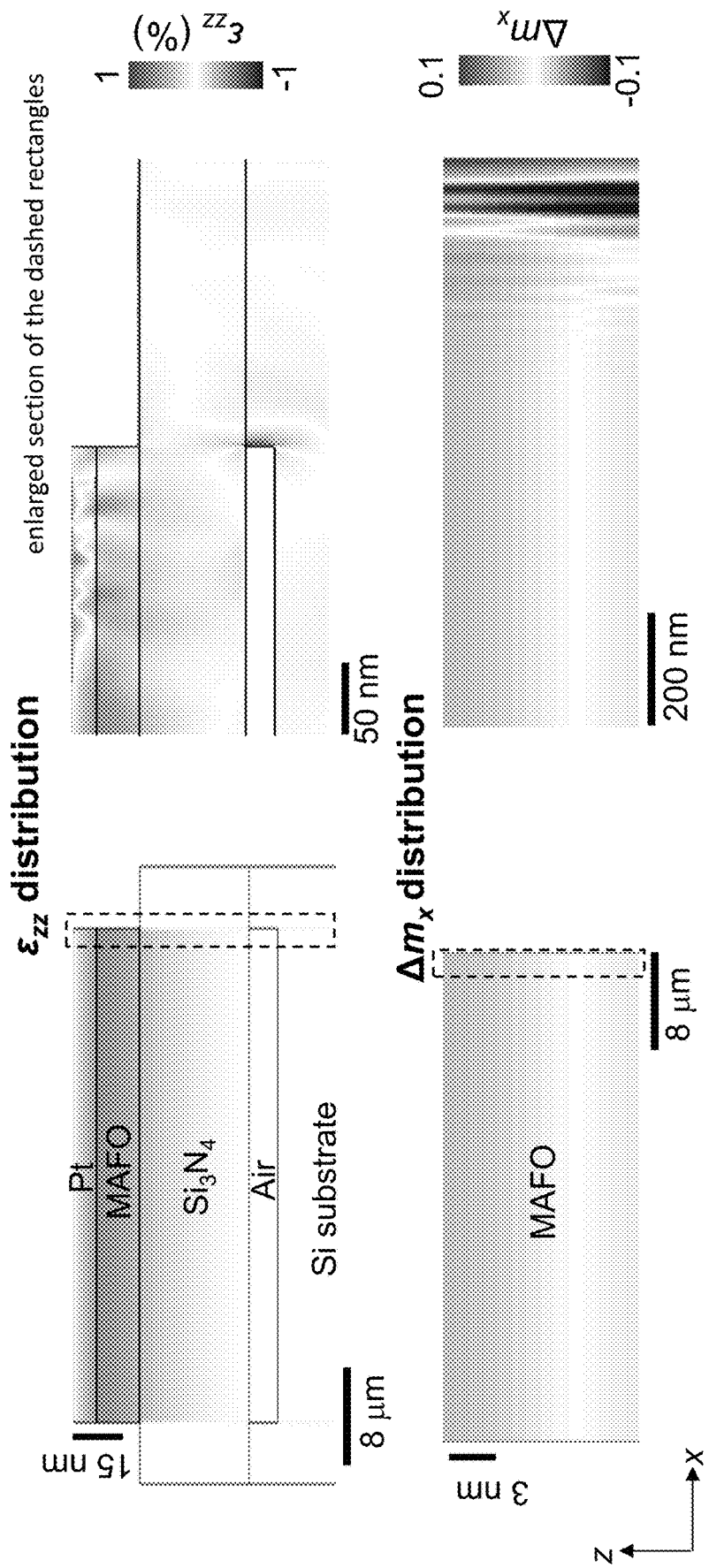
FIG. 8 shows the results of 2D simulations, as described in the Example, showing that both strain and magnetization are largely uniform along the x axis in the membranes of an optoelectronic transducer.

These equations of motion for magnetization, mechanical displacement, EM fields, and the polarization current are numerically solved in a coupled fashion in a one-dimensional (1D) simulation system of Pt/MAFO/Si$_3$N$_4$ membrane with free space above and below the membrane. Such a system makes the Pt/MAFO/Si$_3$N$_4$ a perfect acoustic nanocavity, in which the injected acoustic wave attenuates due to the intrinsic elastic and magnetic loss of the materials. In practice, for the architecture shown in FIG. TA, there would be acoustic wave leakage into the Si$_3$N$_4$ membrane (within the membrane plane) and the Si substrate, leading to spatially nonuniform distributions for both the phonons and magnons near the lateral surfaces of the Pt and MAFO layers. Nevertheless, the 2D simulations show that the acoustic phonons and the acoustically excited magnons are uniform along the in-plane x axis in most areas of the membrane, as shown in FIG. 8. Therefore, a 1D simulation system, where the physical quantities only vary along the z axis, was used to obtain the results shown in this example.

In a 1D system where the acoustically excited magnons are spatially uniform in the xy plane, the free charge current density $J^f$ is in the Pt layer, which is converted from the spin current density $J^s$ via the iSHE ($J^f=J^{iSHE}$), is spatially uniform in the xy plane as well. The magnitude of the spin current density $J_0^s(t)=J^s(z=d_{MAFO}, t)$ at the MAFO/Pt interface is evaluated via the relation $$e_n \cdot J_0^s = \frac{\hbar}{4\pi}Re\left[g_{eff}^{\uparrow\downarrow}\right]m \times \frac{\partial m}{\partial t}, \quad (7)$$

where $d_{MAFO}$ is the MAFO layer thickness, $e_n$ is the unit vector normal to the MAFO/Pt interface and pointing to Pt, h is the reduced Planck constant, and $Re[g_{eff}^{\uparrow\downarrow}]$ is the real part of effective spin-mixing conductance. The spin current density $J^s(z,t)$ decays as a function of the distance from the MAFO/Pt interface inside the Pt layer, $$J^s(z, t) = J_0^s(t)\frac{\sinh[(d_{MAFO} + d_{Pt} - z)/\lambda_{sd}]}{\sinh(d_{Pt}/\lambda_{sd})},$$

where $d_{Pt}$ is the thickness of the Pt layer, and $\lambda_{sd}$ is the spin diffusion length in Pt. The charge current density converted via the iSHE in the Pt layer $$J^{iSHE}(z, t) = \theta_{Pt}\frac{2e}{\hbar}e_n \times [e_n \cdot J^s(z, t)],$$

where $\theta_{Pt}$ is the spin Hall angle of Pt and e is elementary charge. In the proposed heterostructure, the temperature gradient across the MAFO/Pt interface can also lead to the injection of spin current into the Pt via the interfacial spin Seebeck effect. However, such thermally pumped spin current typically lasts for at most tens of ps after the fs laser excitation, which is one-to-two orders of magnitude shorter than that of the spin current from acoustic spin pumping ($10^{-10}$-$10^{-9}$ s, as will be shown below). Therefore, the influence of thermal spin pumping is omitted in this Example for simplicity. All relevant material parameters are summarized as follows. For (001) MAFO (S. Emori, et al., Nano Lett. 18, 4273 (2018); K. B. Modi, M. C. Chhantbar, and H. H. Joshi, Ceram. Int. 32, 111 (2006).), the elastic stiffness coefficients, $c_{11}$=282.9 GPa, $c_{12}$=155.4 GPa, $c_{44}$=154.8 GPa, are assumed to be the same as MAO (A. Yoneda, J. Phys. Earth 38, 19 (1990).); $\rho$=4355 kg m$^{-3}$; gyromagnetic ratio $\gamma$=0.227 rad MHz A$^{-1}$ m; the damping coefficient $\alpha=\alpha^0+\alpha^s$, (T. Nan, et al., Sci. Adv. 6, eabd2613 (2020).) where $\alpha^0$=0.0015 is the intrinsic Gilbert damping coefficient without spin pumping;

$$\alpha^s = \frac{g\mu_B}{4\pi M_s}g_{eff}^{\uparrow\downarrow}\frac{1}{d}$$

(Y. Tserkovnyak, A. Brataas, and G. E. W. Bauer, Phys. Rev. B 66, 224403 (2002).) is the magnetic damping induced by spin pumping (g=2.05 is the g-factor (S. Emori, et al., Nano Lett. 18, 4273 (2018).), $\mu_B$ is the Bohr magneton); saturation magnetization $M_s$=0.0955 MA m$^{-1}$; the exchange coupling coefficient $A_{ex}$=4 pJ m$^{-1}$ is assumed to be same as CoFe2O$_4$ (A. V Azovtsev and N. A. Pertsev, Phys. Rev. B 100, 224405 (2019).), magnetocrystalline anisotropy coefficient $K_1$=−477.5 J m$^{-3}$; magnetoelastic coupling coefficient $B_1$=1.2 MJ m$^{-3}$ and $B_2$=0. For Si$_3$N$_4$, $c_{11}$=283.81 GPa, $c_{12}$=110.37 GPa and $c_{44}$=86.72 GPa are calculated using its Young's modulus of 222 GPa and Poisson's ratio of 0.28 (J. J. Vlassak and W. D. Nix, J. Mater. Res. 7, 3242 (1992).) under assumption of isotropic elasticity. The mass density $\rho$=3170 kg m$^{-3}$. For Si (D. Li and D. G. Cahill, Phys. Rev. B 94, 104306 (2016).), $c_{11}$=167.4 GPa, $c_{12}$=65.2 GPa, $c_{44}$=79.6 GPa and $\rho$=2330 kg m$^{-3}$. For Pt (S. M. Collard and R. B. McLellan, Acta Metall. Mater. 40, 699 (1992).), $c_{11}$=347 GPa, $c_{12}$=250 GPa, $c_{44}$=75 GPa and ρ=21450 kg m$^{-3}$. The plasma frequency $\omega_p$=9.1 rad fs$^{-1}$ and electron relaxation time z=7.5 fs can be found in reference (C. L. Foiles, 4.2 *Drude Parameters of Pure Metals, in Electrical Resistivity, Thermoelectrical Power and Optical Properties* (Springer, 1985), pp. 212-222.). For the case of MAFO/Pt (P. Li, et al., Phys. Rev. Mater. 5, 64404 (2021).), the effective spin-mixing conductance $g_{\mathit{eff}}\uparrow\downarrow$=3.36×10$^{18}$ m$^{-2}$, the spin diffusion length in Pt $\lambda_{sd}$=3.3 nm, and the spin Hall angle of Pt $\theta_{Pt}$=0.83. The stiffness damping coefficients β of all materials are assumed to be same as that of the Si, with β=4.48×10$^{-15}$ s. The value is obtained by fitting the experimentally determined attenuation coefficient λ=9 cm$^{-1}$ of a 7.2 GHz transverse acoustic wave in silicon (D. Li and D. G. Cahill, Phys. Rev. B 94, 104306 (2016).) to an analytical formula $$\beta = \frac{2k\lambda}{\omega(k^2 - \lambda^2)},$$

which has been demonstrated in previous work (S. Zhuang and J.-M. Hu, J. Phys. D. Appl. Phys. 56, 54004 (2023).). The ω=2π×7.2 GHz and the k=ω/ν are the angular frequency and wavenumber, respectively, with ν=5090 m/s being sound velocity (D. Li and D. G. Cahill, Phys. Rev. B 94, 104306 (2016).). The relative permittivity $\varepsilon_r$ is assumed to be 1 for all materials. The numerical methods for solving the equations are described in detail in Supplemental Material 3.

Results and Discussion

FIGS. 4A-4D present the simulation results obtained from the Air/Pt(6.6 nm)/MAFO(12.5 nm)/Si$_3$N$_4$ (31.5 nm)/Air and the Air/Pt(6.6 nm)/MAFO(12.5 nm)/Si$_3$N$_4$ (substrate), where are hereafter referred to as membrane and thin-film heterostructure, respectively. In the case of freestanding membrane, the n=2 mode acoustic phonon and the m=1 mode magnon, both having a frequency of 154 GHz (see FIG. 1E), can resonantly interact with each other. In the case of thin-film heterostructure, the $d_{MAFO}$ was kept the same; hence, the frequency of the m=1 mode magnon was still 154 GHz, but the Si$_3$N$_4$ substrate was assumed to be a perfect sink of acoustic wave. The injection of the photoinduced ps acoustic pulse was modeled by applying a time-varying stress pulse $\sigma_{zz}(t)$ in the form of a Gaussian function, $$\sigma_{zz}(z = d_{MAFO} + d_{Pt}, t) = \sigma_{max} \exp\left[-\frac{t^2}{2\tau^2}\right],$$

at the top surface of the Pt layer, to mimic the injection of photoinduced ps acoustic pulse, where $\sigma_{max}$ is the peak magnitude of the applied stress and set as 3 GPa; τ is a free parameter that controls the pulse duration and set as 1.5 ps. The frequency window of the photoinduced ps acoustic pulse is typically in the sub-THz range but can be extended to nearly 3 THz (T. Henighan, et al., Phys. Rev. B 93, 220301 (2016).). The amplitude of the strain pulse is typically in the order of 10$^{-3}$ (T. Henighan, et al., Phys. Rev. B 93, 220301 (2016); A. V Scherbakov, et al., Phys. Rev. Lett. 105, 117204 (2010); J. V Jdger, et al., Appl. Phys. Lett. 103, 32409 (2013)) and can exceed >1% (V. V Temnov, et al., Nat. Commun. 4, 1468 (2013).). Here, the parameters in the $\sigma_{zz}(t)$ were tuned to ensure that the frequency window of the resultant strain pulse $\varepsilon_{zz}(t)$ covered up to 300 GHz injected acoustic pulse. The peak strain amplitude in the Pt was 0.85%.

Figure 4A:
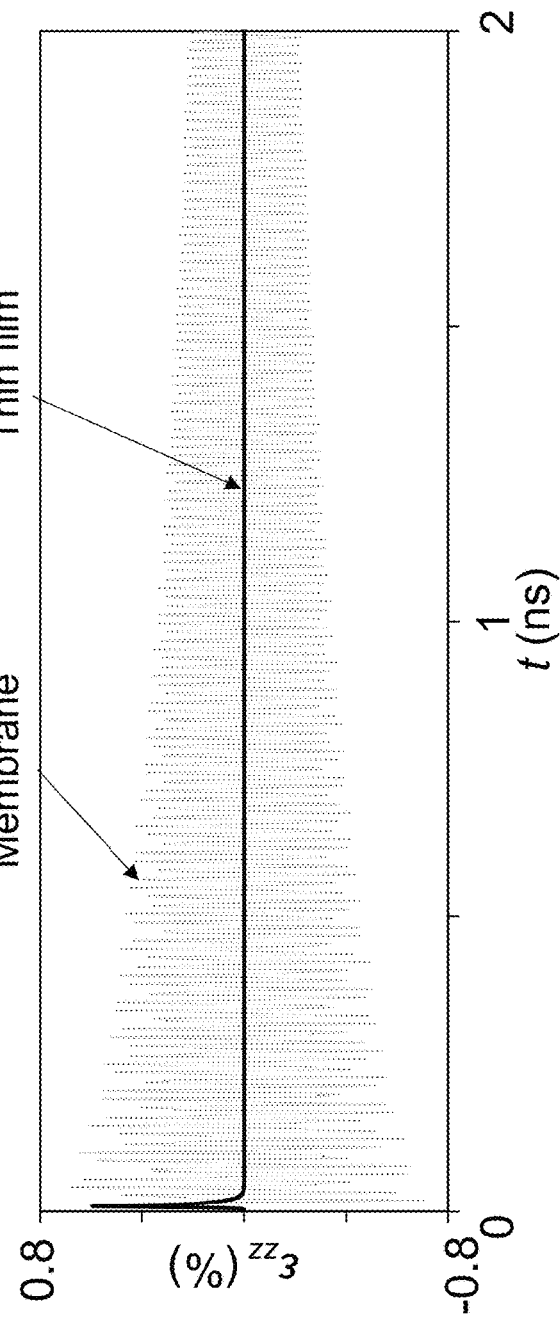
FIG. 4A shows simulated evolutions of the strain $\varepsilon_{zz}(t)$ at the Pt/MAFO interface ($z=d_{MAFO}$) in the cases of a free-standing membrane and a reference thin-film heterostructure, in accordance with the Example.
Figure 4B:
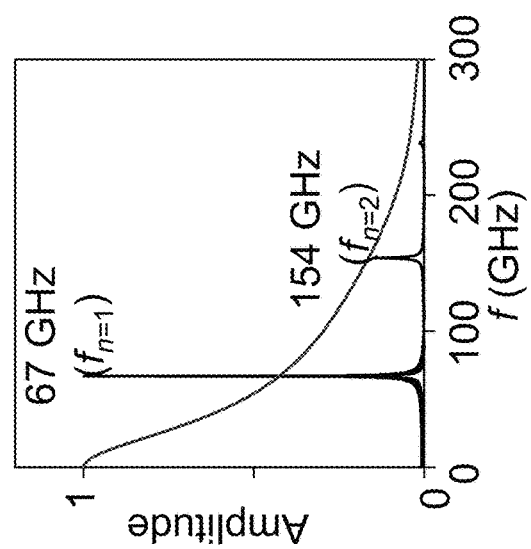
FIG. 4B shows their frequency spectra. The peak frequencies $f_{n=1}$ and $f_{n=2}$ that correspond to phonon modes n=1 and 2 in the case of membrane are labeled.
Figure 4C:
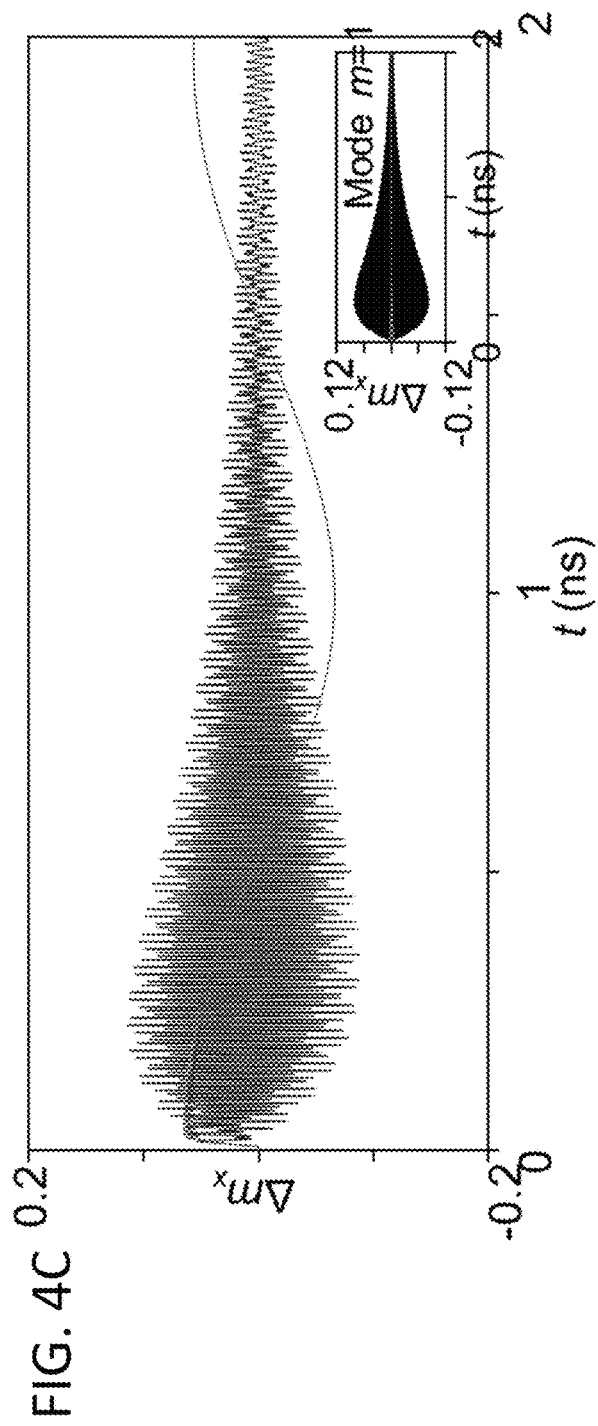
FIG. 4C shows simulated evolutions of the magnetization component $\Delta m_x(t)$ at the Pt/MAFO interface in both cases.

FIG. 4A shows the evolution of the strain component $\varepsilon_{zz}(t)$ at the MAFO/Pt interface in both the freestanding membrane and the thin-film heterostructure, where t=0 is the moment the acoustic pulse was injected. In the case of the membrane, $\varepsilon_{zz}(t)$ is multi-cycle, and its peak amplitude decreased monotonically mainly due to the elastic stiffness damping (see Eq. 3). In the case of the thin-film heterostructure, the injected acoustic pulse was absorbed by the substrate and the $\varepsilon_{zz}(t)$ only showed a single-cycle pulse lasting for ~9 ps. In the case of the membrane, there were two peaks in the frequency spectrum (FIG. 4B) of the $\varepsilon_{zz}(t)$ at 67 GHz and 154 GHz, which are consistent with the analytical calculated frequencies of the n=1 and n=2 mode standing acoustic phonons (FIG. 1E), respectively. By contrast, there was no frequency peak in the spectrum of the $\varepsilon_{zz}(t)$ in the case of the thin-film heterostructure. The effects of the injected acoustic pulse on the magnon amplitude can be seen from the evolution of the magnetization component $\Delta m_x(t)$ at the MAFO/Pt interface, as shown in FIG. 4C. In the case of the freestanding membrane, the amplitude of $\Delta m_x(t)$ showed a clear resonant enhancement until t~320 ps, and the temporal profile of $\Delta m_x(t)$ appeared to be a superposition of two high-frequency magnon modes. This contrasts with the case of the thin-film heterostructure, which contained a significant low-frequency drifting induced by the precession of the m=0 mode magnon (the ferromagnetic resonance).

Figure 4D:
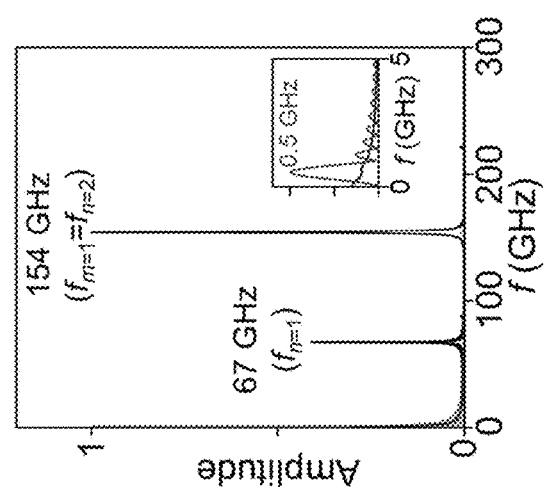
FIG. 4D shows their frequency spectra. The $f_{n=1}$ and $f_{n=2}$ of the magnons that are caused by the acoustic phonons are labeled in the case of the membrane, where the $f_{n=2}$ is equal to the frequency $f_{m=1}$ of m=1 mode magnon. The inset in FIG. 4C shows the evolution of the extracted m=1 mode component of the $\Delta m_x(t)$ in both cases. The inset in FIG. 4D shows the spectrum in low-frequency range from 0 to 5 GHz.

FIG. 4D shows the frequency spectra of the $\Delta m_x(t)$ in FIG. 4C. In the case of the membrane, the extended resonant interaction between the n=2 mode acoustic phonon and the m=1 mode magnon made the spectral amplitude of the latter the largest. The peak at 67 GHz was the magnon mode induced by the n=1 mode acoustic phonon. The presence of such acoustic magnon mode has been omitted in previous theoretical analysis. (U. Vemik, et al., Phys. Rev. B 106, 144420 (2022).) The intrinsic ferromagnetic resonance (FMR) frequency mode (m=0 mode magnon), which has a frequency of ~0.53 GHz, cannot be identified. Once again, such spectral features in the membrane are in stark contrast with those in the thin film, where the 0.53 GHz FMR mode dominated (see inset of FIG. 4D); the 67 GHz mode magnon was absent; the m=1 mode magnon was barely appreciable in the spectrum, although its presence is evidenced by the high-frequency oscillation in the corresponding $\Delta m_x(t)$ shown in FIG. 4C. The temporal profiles of the m=1 mode in the membrane and thin film were further extracted by performing inverse Fourier transform of the corresponding peak at 154 GHz. As shown in the inset of FIG. 4C, the peak amplitude of the m=1 mode magnon is about 12 times larger than that in the thin film case. The lifetime of the m=1 mode magnon (at which the peak amplitude reduced to 1/e of its maximum) was 0.97 ns in the membrane, which is about 5 times longer than the 0.19 ns in the thin film.

Figure 5B:
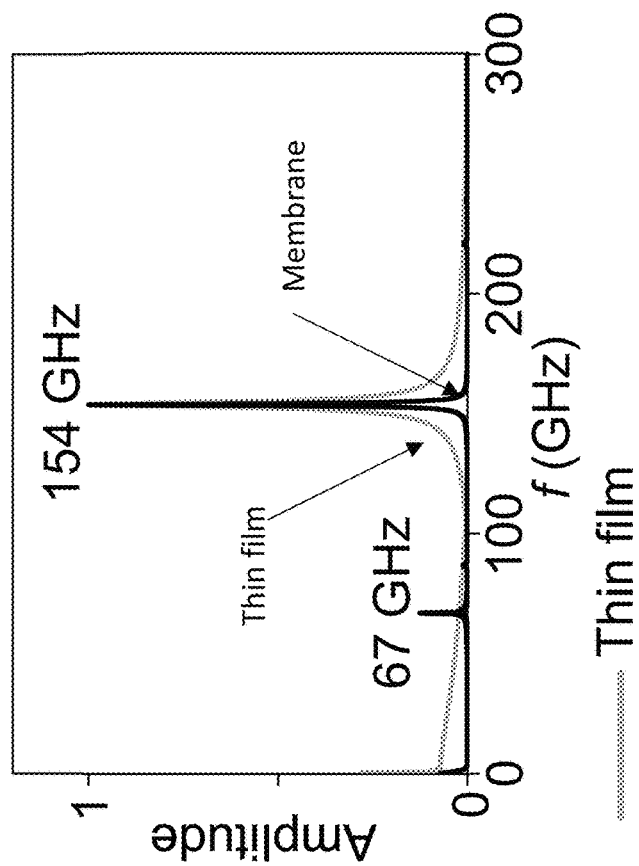
FIG. 5B shows their frequency spectra. The peak frequencies are labeled.
Figure 5A:
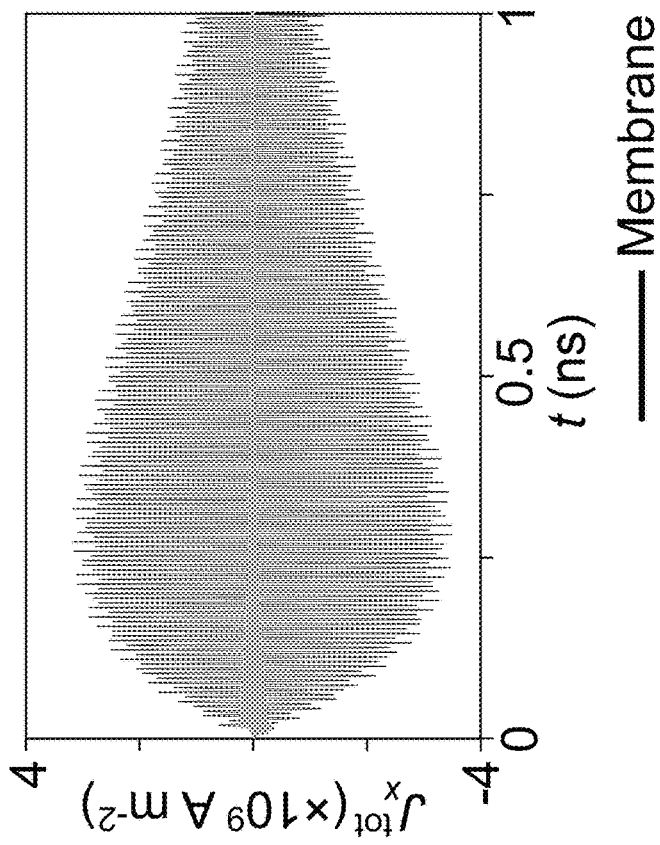
FIG. 5A shows simulated evolutions of the total charge current density $J^{tot}(t)$ at the Pt/MAFO interface ($z=d_{MAFO}$) in the case of free-standing membrane (black line) and thin-film heterostructure (grey line)

FIG. 5A shows the temporal evolution of the total charge current density $J^{tot}(z=d_{MAFO}, t)$ at the Pt/MAFO interface in the case of the freestanding membrane. As discussed above, $J^{tot}$ is a sum of the iSHE charge current $J^{iSHE}(z=d_{MAFO}, t)$ from spin pumping and the polarization (eddy) current $J^p(z=d_{MAFO}, t)$ generated by the emitted EM pulse. The profile of Y was similar to the $J^{iSHE}$, but it had a smaller amplitude and was 1800 out of phase. Like the profile of the $\Delta m_x(t)$ shown in FIG. 4C, the $J_x^{tot}(t)$ increased at first before starting to decrease at t~320 ps, with a lifetime of ~1 ns. The lifetime was evaluated as the time to when the amplitude of the $J_x^{tot}(t_0)$ decreases to 1/e of its maximum peak value $J_x^{tot}$(~320 ps). The profile of the electric field component $E^{EM}(t)$ of the emitted EM wave in the free space was almost same as that of the $J_x^{tot}(t)$, and its peak amplitude was ~400 V m$^{-1}$, which is large enough for measurement by the time-domain electro-optical sampling. FIG. 5B shows the frequency spectrum of the $J_x^{tot}(t)$. The values of the two peak frequencies (67 GHz and 154 GHz) are the same as those in the spectrum of the $\Delta m_x(t)$ (FIG. 4D). Notably, the spectral amplitude of the 154 GHz peak is about 10 times larger than the 67 GHz peak. This enhancement is even more significant than that shown in FIG. 4D, because the higher-frequency magnon leads to a larger $J^{iSHE}$ via spin pumping (see Equation (7)) as compared to lower-frequency magnon. The charge current and the EM radiation with frequencies of 154 GHz and 67 GHz were both within the detectable range of the coplanar probe tip for sub-THz current pulse and advanced detector for THz radiation. In the case of the thin-film heterostructure, the amplitude of the $J_x^{tot}(t)$ was one order of magnitude smaller and its lifetime was ~200 ps. The frequency spectrum of the $J_x^{tot}(t)$ shows a single peak at 154 GHz which corresponds to the m=1 mode magnon, as also shown in FIG. 5B. The FMR magnon (with a frequency of 0.53 GHz), which exists in the frequency spectrum of $\Delta m_x$, only has a negligible contribution to the $J_x^{tot}$ due to its much lower frequency than the m=1 mode magnon. Therefore, it is not appreciable in the spectrum of $J_x^{tot}$ and cannot be seen from its temporal profile (FIG. 5A).

FIG. 1G shows the analytically calculated frequencies (f) of the m=0 (FMR) and m=1 mode magnon as a function of the magnitude of the bias magnetic field $|H^{bias}|$, where the magnetic-field-independent frequencies of the standing acoustic phonon modes n=1 to 5 are also shown. For each magnitude of $|H^{bias}|$ the direction of the $H^{bias}$ was adjusted to keep the equilibrium magnetization 45° off the xy plane in all cases. As shown in FIG. 1G, the m=1 mode magnon can be magnetically tuned to resonate with the n=2, 3, 4, and 5 mode phonon at 154 GHz, 240 GHz, 307 GHz, and 374 GHz, under $|H^{bias}|$=0.087, 3.02 T, 5.36 T, and 7.69 T, respectively. The case of $|H^{bias}|$=3.02 T was considered as an example for demonstrating the magnetic-field tunable resonance frequency and hence the total charge current density in the time domain by dynamical phase-field simulations.

Figure 6B:
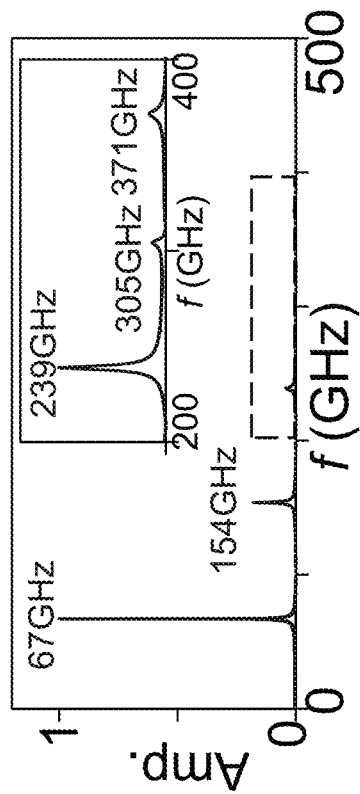
FIG. 6B shows its frequency spectrum. The frequency peaks are labeled, and the inset shows the spectrum in the range from 200 GHz to 400 GHz.
Figure 6D:
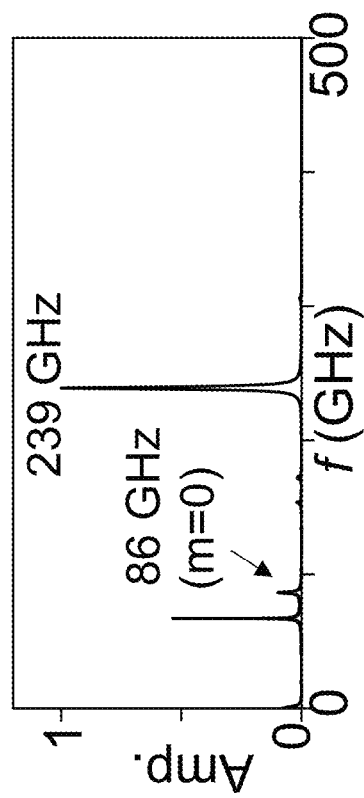
FIG. 6D shows its frequency spectrum. The highest frequency peak is labeled. Comparing these results to the results shown in FIGS. 5A and 5B, where the same membrane is utilized, it can be seen that the application of a different bias magnetic field $|H^{bias}|$ leads to significant changes in both the peak frequency and amplitude of the $J^{tot}(t)$.
Figure 6A:
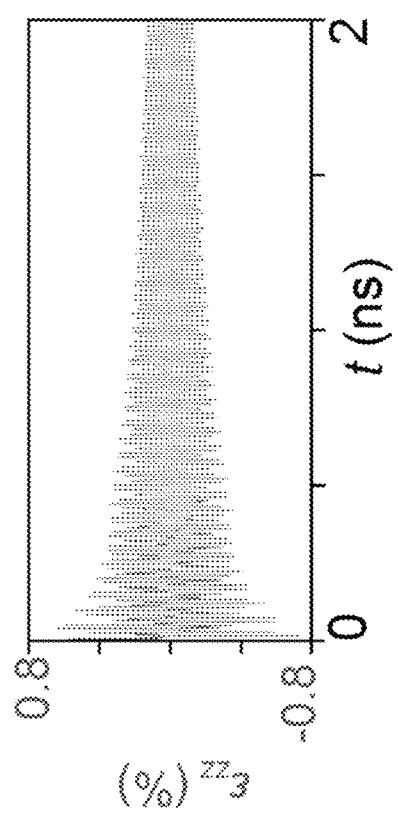
FIG. 6A shows the simulated evolution of the strain $\varepsilon_{zz}(t)$ at the Pt/MAFO interface ($z=d_{MAFO}$)
Figure 6C:
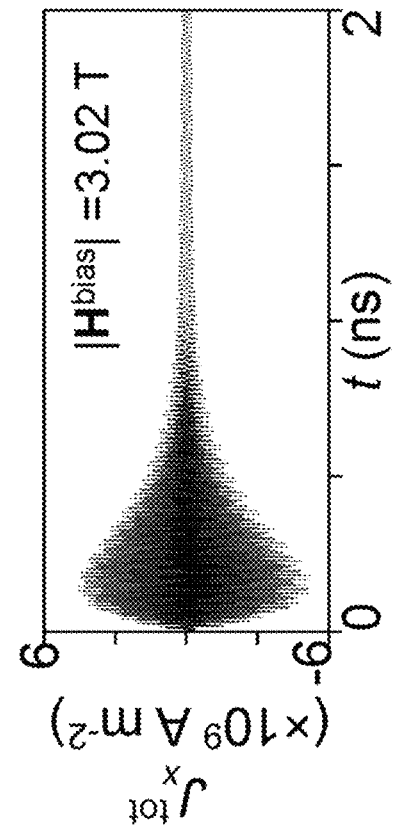
FIG. 6C shows the simulated evolution of the total charge current density $J^{tot}(t)$ at the Pt/MAFO interface ($z=d_{MAFO}$) in the case of $|H^{bias}|=30.2$ T.

FIG. 6A shows the evolution of the $\varepsilon_{zz}(t)$ at the MAFO/Pt interface. Like the case of the membrane in FIG. 4A, $\varepsilon_{zz}(t)$ is multi-cycle and its peak amplitude decreased monotonically. The free parameter $\tau$ in the applied stress $\sigma_{zz}(t)$ is set to be 0.8 ps and the frequency window of the injected strain pulse was tuned to cover frequencies up to 500 GHz. As a result, phonon modes n=1 to 5 can all be excited. This can be seen from the frequency spectrum of the $\varepsilon_{zz}(t)$ shown in FIG. 6B where the five peak frequencies agreed well with the analytical calculated ones of the phonon modes n=1 to 5. The evolution of the total charge current density $J_x^{tot}(t)$ at the MAFO/Pt interface is shown in FIG. 6C, which displays a clear feature of resonant enhancement like the case of 154 GHz ($|H^{bias}|$=0.087 T) in FIG. 5A. The lifetime of $J_x^{tot}(t)$, ~500 ps, is shorter than that in the case of 154 GHz because of the shorter lifetime of the driving acoustic phonon at higher frequency. FIG. 6D shows the frequency spectrum of the $J_x^{tot}(t)$. Remarkably, the spectral amplitude of the 239 GHz peak is the largest even though the n=3 mode phonon (239 GHz) has a negligibly small spectral amplitude (c.f., FIG. 6B). This result clearly demonstrates the effectiveness of using weak, higher-order phonon modes to excite THz magnons via the resonant magnon-phonon interaction. The other two frequency peaks in FIG. 6D were contributed by the m=0 (FMR) mode magnon (86 GHz) and the acoustic magnon mode (67 GHz) induced by the n=1 mode acoustic phonon.

Conclusions

This Example demonstrates both the amplitude enhancement and the lifetime extension of the standing magnon modes due to long-lasting resonant magnon-phonon interaction. The frequencies of the phonons and the magnons confined in a free-standing heavy-metal/magnetic-insulator/dielectric membrane, and hence the frequencies of their resonant interaction, were obtained via analytical calculations. Using dynamical phase-field simulations, it was demonstrated that the amplitude of the magnon mode can be enhanced by 12 times and its relaxation time can be extended by hundreds of picoseconds. The electrical current pulses in the metal that are generated by these acoustically excited magnons, can be detected by a current detector or indirectly by measuring the free-space electromagnetic radiation produced by the electrical current pulses. Moreover, the in-situ tunability of the resonant frequency of the magnon-phonon interaction was demonstrated via tuning the applied bias magnetic field. The capability of integrating the proposed membrane on silicon substrate enables (sub)THz system on-a-chip applications, such as an optoelectronic transducer, which is able to convert a fs laser pulse to electrical current oscillation with frequency >100 GHz. Such optoelectronic transducers can be implemented in the optoelectronic oscillator system to break through the current frequency limitation of 100 GHz, where the maximum achievable frequency is determined by the operation frequency band of the optical and electrical devices in the system, such as the optical-electrical converter.

Figure 11:
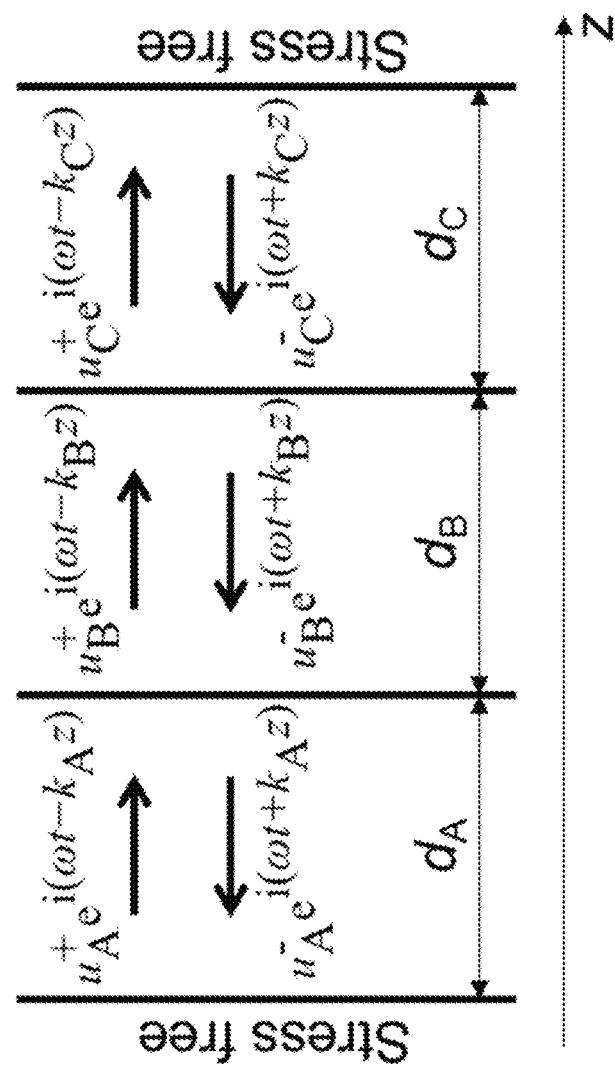
FIG. 11 shows a schematic of an elastically heterogeneous tri-layer membrane structure where mechanical displacement waves u(z,t) are propagating.

Supplemental Material 1. Derivation of Frequencies of Standing Acoustic Phonon Modes in a Freestanding Trilayer Membrane The frequencies of the acoustic standing waves were obtained by solving the system of linear equations that describe the boundary conditions of the acoustic wave. Firstly, an elastically heterogeneous tri-layer structure as shown in FIG. 11 was considered, with $d_\xi$ being the thickness of each layer $\xi$=A, B, C, and it was assumed that the mechanical displacement waves propagating in the structure had only the z components. The solutions of the z-component mechanical displacement were assumed to be the combination of the plane waves $u_\xi^+ e^{i(\omega t - k_\xi z)}$ propagating along +z and $u_\xi^- e^{i(\omega t + k_\xi z)}$ along −z in each layer, where $u_\xi^+$ and $u_\xi^-$ are amplitudes of the wave components, $\omega$ is the angular frequency, and $k_\xi = \omega/v_\xi$ is the gular wavenumber with $v_\xi$ being the longitudinal sound speed. With these, the out-of-plane normal strain $$\varepsilon_\xi(z, t) = \frac{\partial u_\xi}{\partial z}$$

and stress $\sigma_\xi(z,t) = c_\xi e_\xi(z,t)$ in each layer can be calculated as $$ik_\xi [u_\xi^- e^{i(\omega t + k_\xi z)} - u_\xi^+ e^{i(\omega t - k_\xi z)}]$$

and $$ic_\xi k_\xi [u_\xi^- e^{i(\omega t + k_\xi z)} - u_\xi^+ e^{i(\omega t - k_\xi z)}],$$

respectively, where $c_\xi$ denotes the elastic stiffness component $c_{11}$ of each layer $\xi$ here.

The stress-free boundary condition at the bottom surface of the layer A, $\sigma_A(z=0, t)=0$, gives $$c_A k_A (u_A^- - u_A^+) = 0. \tag{S1}$$

Similarly, the stress-free boundary condition at the top surface of the layer C, $\sigma_C(z=d, t)=0$, gives $$c_C k_C [u_C^- e^{ik_\xi d} - u_C^+ e^{-ik_\xi d}] = 0, \tag{S2}$$

where $d=d_A+d_B+d_C$ is the total thickness of the entire structure.

Regarding the interfaces between two elastically different materials, the stress or and the displacement u should be continuous across the interfaces. At the A/B interface, the continuous displacement, $u_A(z=d_A, t)=u_B(z=d_A, t)$, gives $$u_A^+ e^{-ik_A d_A} + u_A^- e^{ik_A d_A} = u_B^+ e^{-ik_B d_A} + u_B^- e^{ik_B d_A}, \tag{S3}$$

and the continuous stress, $\sigma_A(z=d_A, t)=\sigma_B(z=d_A, t)$, gives $$c_A k_A [u_A^- e^{ik_A z} - u_A^+ e^{-ik_A z}] = c_B k_B [u_B^- e^{ik_B z} - u_B^+ e^{-ik_B z}]. \tag{S4}$$

Similarly, the continuous displacement at the B/C interface, $u_B(z=d_A+d_B, t)=u_C(z=d_A+d_B, t)$, gives $$u_B^+ e^{-ik_B(d_A+d_B)} + u_B^- e^{ik_B(d_A+d_B)} = u_C^+ e^{-ik_C(d_A+d_B)} + u_C^- e^{ik_C(d_A+d_B)}, \tag{S5}$$

and the continuous stress, $\sigma_B(z=d_A+d_B, t)=\sigma_C(z=d_A+d_B, t)$, gives $$c_B k_B [u_B^- e^{ik_B(d_A+d_B)} - u_B^+ e^{-ik_B(d_A+d_B)}] = \tag{S6}$$
$$c_C k_C [u_C^- e^{ik_C(d_A+d_B)} - u_C^+ e^{-ik_C(d_A+d_B)}].$$

The Supplemental Equations S1-S6 above form a system of linear equations with $u_\xi^+$ and $u_\xi^-$ being 6 variables to be solved, and the corresponding coefficient matrix is given by, $$\begin{Bmatrix} 1 & -1 & 0 & 0 & 0 & 0 \\ e^{-ik_A d_A} & e^{ik_A d_A} & e^{-ik_B d_A} & e^{-ik_B d_A} & 0 & 0 \\ c_A k_A e^{-ik_A d_A} & -c_A k_A e^{-ik_A d_A} & -c_B k_B e^{-ik_B d_A} & c_B k_B e^{ik_B d_A} & 0 & 0 \\ 0 & 0 & e^{-ik_B(d_A+d_B)} & e^{ik_B(d_A+d_B)} & -e^{-ik_C(d_A+d_B)} & -e^{ik_C(d_A+d_B)} \\ 0 & 0 & c_B k_B e^{-ik_B(d_A+d_B)} & -c_B k_B e^{ik_B(d_A+d_B)} & -c_C k_C e^{ik_C(d_A+d_B)} & c_C k_C e^{ik_C(d_A+d_B)} \\ 0 & 0 & 0 & 0 & e^{-ik_C d} & -e^{ik_C d} \end{Bmatrix}.$$

To obtain a non-trivial solution to the linear equations system, the determinant of this matrix should be equal to 0, which gives the following equation, $$c_A c_C \left(-1 + e^{\frac{2id_A \omega}{v_A}} \frac{2id_A \omega}{v_A}\right)\left(-1 + e^{\frac{2id_B \omega}{v_B}}\right)\left(-1 + e^{\frac{2id_C \omega}{v_C}}\right) v_B^2 + \tag{S7}$$

-continued
$$c_B^2 \left(1 + e^{\frac{2id_A \omega}{v_A}}\right)\left(-1 + e^{\frac{2id_B \omega}{v_B}}\right)\left(1 + e^{\frac{2id_C \omega}{v_C}}\right) v_A v_C +$$
$$c_B c_C \left(1 + e^{\frac{2id_A \omega}{v_A}} \frac{2id_A \omega}{v_A}\right)\left(1 + e^{\frac{2id_B \omega}{v_B}}\right)\left(-1 + e^{\frac{2id_C \omega}{v_C}}\right) v_A v_B +$$
$$c_A c_B \left(-1 + e^{\frac{2id_A \omega}{v_A}} \frac{2id_A \omega}{v_A}\right)\left(1 + e^{\frac{2id_B \omega}{v_B}}\right)\left(1 + e^{\frac{2id_C \omega}{v_C}}\right) v_B v_C = 0,$$

where all wavenumbers $k_\xi$ are replaced by $\omega/v_\xi$.

Supplemental Material 2. Expressions of $\Omega$ and $\Lambda$ in the Analytical Formula of Exchange Magnon Frequency Assuming the magnetization at the initial equilibrium state is $(m_x^0, m_y^0, m_z^0)$, the expressions of the $\Omega$ and $\Lambda$ are given by, $$\Omega = (\Psi_{23} - \Psi_{32}) m_x^0 + (\Psi_{31} - \Psi_{13}) m_y^0 + (\Psi_{12} - \Psi_{21}) m_z^0, \tag{S8}$$

and $$\Lambda = \Psi_{23}\Psi_{32} + \Psi_{31}\Psi_{13} + \Psi_{12}\Psi_{21}, \tag{S9}$$

where $$\Psi_{12} = H_z^{bias} - M_s m_z^0 - \frac{2K_1}{\mu_0 M_s}\left(3 m_y^{0^2} m_z^0 - m_z^{0^3}\right), \tag{S10}$$

$$\Psi_{13} = -H_y^{bias} - M_s m_y^0 - \frac{2K_1}{\mu_0 M_s}\left(m_y^{0^3} - 3 m_y^0 m_z^{0^2}\right), \tag{S11}$$

$$\Psi_{21} = -H_z^{bias} + M_s m_z^0 - \frac{2K_1}{\mu_0 M_s}\left(m_z^{0^3} - 3 m_z^0 m_x^{0^2}\right), \tag{S12}$$

$$\Psi_{23} = H_x^{bias} + M_s m_x^0 - \frac{2K_1}{\mu_0 M_s}\left(3 m_z^{0^2} m_x^0 - m_x^{0^3}\right), \tag{S13}$$

$$\Psi_{31} = H_y^{bias} - \frac{2K_1}{\mu_0 M_s}\left(3 m_x^{0^2} m_y^0 - m_y^{0^3}\right), \tag{S14}$$

$$\Psi_{32} = -H_x^{bias} - \frac{2K_1}{\mu_0 M_s}\left(m_x^{0^3} - 3 m_x^0 m_y^{0^2}\right), \tag{S15}$$

with $K_1$ being the magnetocrystalline anisotropy coefficient. The magnon dispersion relation f(k) is obtained analytically from the linearization of the Landau Lifshitz Gilbert (LLG) equation under zero magnetic damping ($\alpha=0$), and the detailed procedures can be found in a previous publication. (S. Zhuang and J.-M. Hu, Npj Comput. Mater. 8, 167 (2022).)

Supplemental Material 3. Numerical Methods

For the simulations described above, the system was discretized into a 1D grid of computational cells along the z axis, with a cell size $\Delta z=0.83$ nm. The equations 2-6 were solved simultaneously with a real-time step $\Delta t=2\times 10^{-18}$ s. When solving the equations, the central finite difference method was used to numerically calculate the spatial derivatives, and the classical Runge-Kutta method was used for time-marching.

When solving the LLG equation (Eq. 2), the magnetic boundary condition $\partial m/\partial n=0$ was applied on all surfaces of the MAFO where n is unit vector normal to the surface. (V.

V Kruglyak, et al., J. Phys. Condens. Matter 26, 406001 (2014).) When solving the elastodynamic equation (Eq. 3), the continuity of the mechanical displacement u and stress σ were applied at any interface between two elastically different materials. The boundary condition of continuous stress at the Pt top surface and the $Si_3N_4$ bottom surface became a stress-free boundary condition since the stress σ in the free space is 0, specifically, $\sigma_{iz}=0$ (i=x, y, z). As mentioned above, the injection of the ps bulk acoustic pulse $\varepsilon_{zz}(z,t)$ was simulated by applying a time-varying stress $\sigma_{zz}(t)$ (time-dependent boundary condition) at the top surface of the Pt layer. Note that the applied stress $\sigma_{zz}(t)$ converged to 0 in the course of time, which enabled the top surface of the Pt layer to be stress-free again after the injection of the ps acoustic pulse. Maxwell's equations (Eqs. 4-5) were solved using the conventional finite-difference time-domain (FDTD) method. In the 1D system, the absorbing boundary condition $$\frac{\partial E^{EM}}{\partial z} = -\frac{1}{c}\frac{\partial E^{EM}}{\partial t}$$

was applied on both the bottom and top surfaces of the computational system to prevent the emitted EM waves from being reflected to the system, where c is light speed in the free space. (J.-M. Jin, *Theory and Computation of Electromagnetic Fields* (John Wiley & Sons, 2011).)

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with both constructions are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An optoelectronic device comprising at least one optoelectronic transducer, the at least one optoelectronic transducer comprising:
   a membrane suspended over an air gap, the membrane comprising:
      a layer of a dielectric material covering at least a portion of the air gap;
      a layer of a magnetic insulator over the layer of the dielectric material; and
      a layer of an electrically conductive material over the layer of the magnetic insulator; and
   a femtosecond laser configured to direct a femtosecond-timescale light pulse onto the layer of the electrically conductive material.

2. The optoelectronic device of claim 1, further comprising a magnetic field source configured to apply an external magnetic field across the membrane.

3. The optoelectronic device of claim 1, wherein the layer of the magnetic insulator comprises $MgAl_{0.5}Fe_{1.5}O_4$.

4. The optoelectronic device of claim 1, wherein the layer of the electrically conductive material comprises platinum.

5. The optoelectronic device of claim 3, wherein the layer of the electrically conductive material comprises platinum, and the layer of the dielectric material comprises silicon nitride.

6. The optoelectronic device of claim 1, wherein the membrane has a thickness of less than 100 nm.

7. The optoelectronic device of claim 1, wherein the layer of the magnetic insulator comprises $Y_3Fe_5O_{12}$.

8. The optoelectronic device of claim 1, wherein the layer of the magnetic insulator comprises $Gd_3Fe_5O_{12}$.

9. The optoelectronic device of claim 1, comprising at least two of the optoelectronic transducers.

10. The optoelectronic device of claim 9, wherein the layer of the electrically conductive material in the at least two optoelectronic devices is a common layer of the electrically conductive material that spans the at least two optoelectronic devices.

11. A method of generating an alternating electrical current in an electrically conductive material using an optoelectronic device comprising at least one optoelectronic transducer comprising:
    a membrane suspended over an air gap, the membrane comprising:
       a layer of a dielectric material covering at least a portion of the air gap;
       a layer of a magnetic insulator over the layer of the dielectric material; and
       a layer of the electrically conductive material over the layer of the magnetic insulator; and
    a femtosecond laser configured to direct a femtosecond-frequency light pulse onto the layer of the electrically conductive material,
    the method comprising:
    directing a fs-timescale laser pulse onto the layer of the electrically conductive material, whereby the fs-timescale laser pulse excites standing longitudinal acoustic phonon modes and standing magnon modes in the membrane, and at least one standing longitudinal acoustic phonon mode is in resonance with at least one standing magnon mode at a resonance frequency, and further whereby an in-plane electrical pulse having a sinusoidally varying alternating current is generated in the layer of the electrically conductive material and the in-plane electrical pulse has a resonantly-enhanced oscillation frequency at the resonance frequency.

12. The method of claim 11, wherein the in-plane electrical pulse has a lifetime of at least 0.5 ns.

13. The method of claim 11, wherein the resonance frequency is in the range from 30 GHz to 3000 GHz.

14. The method of claim 11, wherein the resonance frequency is in the range from 30 GHz to 300 GHz.

15. The method of claim 11, wherein the layer of the magnetic insulator comprises $MgAl_{0.5}Fe_{1.5}O_4$.

16. The method of claim 15, wherein the layer of the electrically conductive material comprises platinum.

17. The method of claim 16, wherein the layer of the dielectric material comprises silicon nitride.

18. The method of claim 11, further comprising applying an external magnetic field across the membrane and adjusting a magnitude of the external magnetic field to modulate the resonance frequency.

19. The method of claim 11, wherein the optoelectronic device comprises at least two of the optoelectronic transducers, and the layer of the electrically conductive material in the at least two optoelectronic devices is a common layer of the electrically conductive material that spans both of the at least two optoelectronic transducers.

20. The method of claim 19, further comprising directing a second fs-timescale laser pulse onto the layer of the electrically conductive material of the second of the at least two optoelectronic transducers, whereby the second fs-timescale laser pulse excites standing longitudinal acoustic phonon modes and standing magnon modes in the membrane of the second optoelectronic transducer, and at least one standing longitudinal acoustic phonon mode is in resonance with at least one standing magnon mode at a resonance frequency, and further whereby a second in-plane electrical pulse having a sinusoidally varying alternating current is generated in the layer of the electrically conductive material of the second optoelectronic transducer, and the second in-plane electrical pulse has a resonantly-enhanced oscillation frequency at the resonance frequency.

21. The method of claim 20, wherein the in-plane electrical pulse generated in the first optoelectronic transducer interacts with the second in-plane electrical pulse generated in the second optoelectronic transducer to modulate an electrical current flowing in the layer of the electrically conductive material.

* * * * *

UNITED STATES PATENT AND TRADEMARK OFFICE
CERTIFICATE OF CORRECTION

PATENT NO. : 12,345,930 B2
APPLICATION NO. : 18/298685
DATED : July 1, 2025
INVENTOR(S) : Jiamian Hu et al.

It is certified that error appears in the above-identified patent and that said Letters Patent is hereby corrected as shown below:

In the Specification

Figure 10A:
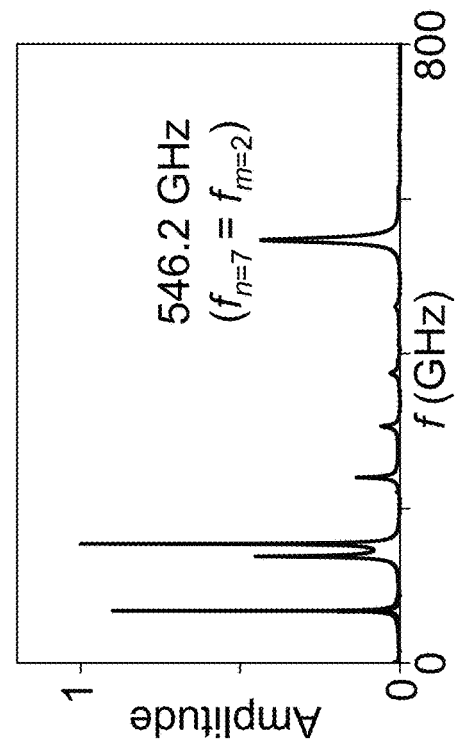
FIG. 10B shows the evolution of electric current $J_c(t)$ in the Pt layer of the optoelectronic transducer of FIG. 10A.
FIG. 10C shows the frequency spectrum of the electric current $J_c(t)$ in the Pt layer of the optoelectronic transducer of FIG. 10A.
Figure 10B:
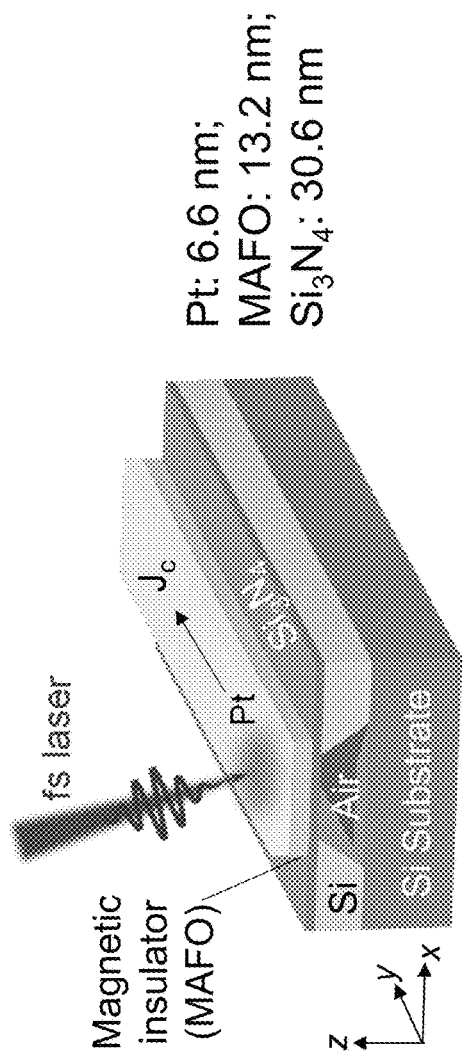
Figure 10C:
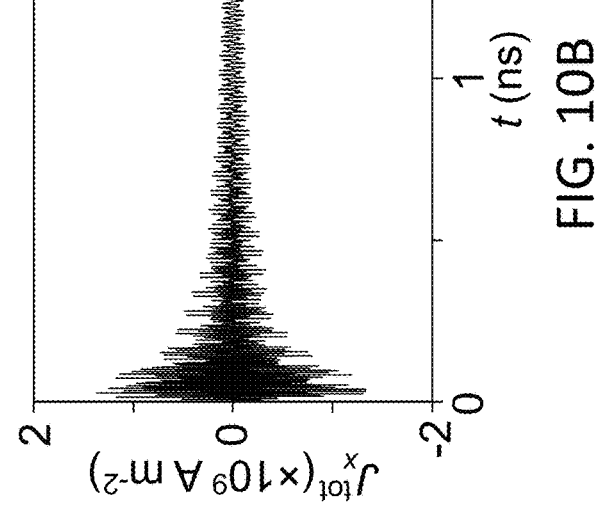

Column 4, Line 15:
Delete the phrase "FIG. TOA" and replace with --FIG. 10A--.

Column 4, Line 34:
Delete the phrase "FIG. TA" and replace with --FIG. 1A--.

Column 5, Line 36:
Delete the phrase "time, to," and replace with --time, $t_0$,--.

Column 5, Line 38:
Delete the phrase "The to is," and replace with --The $t_0$ is--.

Column 10, Line 27:
Delete the phrase "FIG. TA" and replace with --FIG. 1A--.

Column 10, Line 35:
Delete the phrase "aps" and replace with --a *ps*--.

Column 11, Line 12:
Delete the phrase "$\left(-1+e^{\frac{2id_{SiN}\omega}{v_{SiN}}}\right)V_P V_{MAFO}$" and replace with --$\left(-1+e^{\frac{2id_{SiN}\omega}{v_{SiN}}}\right)V_{Pt} V_{MAFO}$--.

Column 13, Line 50:
Delete the phrase "FIG. TA" and replace with --FIG. 1A--.

Column 16, Line 38:
Delete the phrase "Vemik," and replace with --Vernik,--.

Signed and Sealed this
Ninth Day of September, 2025

Coke Morgan Stewart
*Acting Director of the United States Patent and Trademark Office*

CERTIFICATE OF CORRECTION (continued)
U.S. Pat. No. 12,345,930 B2

Column 19, Lines 52-56:
Delete the phrase

"$$\begin{pmatrix} 1 & -1 & 0 & 0 & 0 & 0 \\ e^{-ik_A d_A} & e^{ik_A d_A} & -e^{-ik_B d_A} & e^{-ik_B d_A} & 0 & 0 \\ c_A k_A e^{-ik_A d_A} & -c_A k_A e^{-ik_A d_A} & -c_B k_B e^{-ik_B d_A} & c_B k_B e^{ik_B d_A} & 0 & 0 \\ 0 & 0 & e^{-ik_B(d_A+d_B)} & e^{ik_B(d_A+d_B)} & -e^{-ik_C(d_A+d_B)} & -e^{ik_C(d_A+d_B)} \\ 0 & 0 & c_B k_B e^{-ik_B(d_A+d_B)} & -c_B k_B e^{ik_B(d_A+d_B)} & -c_C k_C e^{ik_C(d_A+d_B)} & c_C k_C e^{ik_C(d_A+d_B)} \\ 0 & 0 & 0 & 0 & e^{-ik_C d} & -e^{ik_C d} \end{pmatrix}$$"

and replace with

--$$\begin{pmatrix} 1 & -1 & 0 & 0 & 0 & 0 \\ e^{-ik_A d_A} & e^{ik_A d_A} & -e^{-ik_B d_A} & -e^{ik_B d_A} & 0 & 0 \\ c_A k_A e^{-ik_A d_A} & -c_A k_A e^{ik_A d_A} & -c_B k_B e^{-ik_B d_A} & c_B k_B e^{ik_B d_A} & 0 & 0 \\ 0 & 0 & e^{-ik_B(d_A+d_B)} & e^{ik_B(d_A+d_B)} & -e^{-ik_C(d_A+d_B)} & -e^{ik_C(d_A+d_B)} \\ 0 & 0 & c_B k_B e^{-ik_B(d_A+d_B)} & -c_B k_B e^{ik_B(d_A+d_B)} & -c_C k_C e^{-ik_C(d_A+d_B)} & c_C k_C e^{ik_C(d_A+d_B)} \\ 0 & 0 & 0 & 0 & e^{-ik_C d} & -e^{ik_C d} \end{pmatrix}$$--.

Column 19, Line 65:

Delete the phrase "$c_A c_C \left(-1+e^{\frac{2id_A \omega 2id_A \omega}{v_A \quad v_A}}\right)\left(-1+e^{\frac{2id_B \omega}{v_B}}\right)\left(-1+e^{\frac{2id_C \omega}{v_C}}\right) v_B^2$" and replace with --$c_A c_C \left(-1+e^{\frac{2id_A \omega}{v_A}}\right)\left(-1+e^{\frac{2id_B \omega}{v_B}}\right)\left(-1+e^{\frac{2id_C \omega}{v_C}}\right) v_B^2$--.

Column 20, Line 5:

Delete the phrase "$c_B c_C \left(1+e^{\frac{2id_A \omega 2id_A \omega}{v_A \quad v_A}}\right)\left(1+e^{\frac{2id_B \omega}{v_B}}\right)\left(-1+e^{\frac{2id_C \omega}{v_C}}\right) v_A v_B$" and replace with --$c_B c_C \left(1+e^{\frac{2id_A \omega}{v_A}}\right)\left(1+e^{\frac{2id_B \omega}{v_B}}\right)\left(-1+e^{\frac{2id_C \omega}{v_C}}\right) v_A v_B$--.

Column 20, Line 7:

Delete the phrase "$c_A c_B \left(-1+e^{\frac{2id_A \omega 2id_A \omega}{v_A \quad v_A}}\right)\left(1+e^{\frac{2id_B \omega}{v_B}}\right)\left(1+e^{\frac{2id_C \omega}{v_C}}\right) v_B v_C = 0,$" and replace with --$c_A c_B \left(-1+e^{\frac{2id_A \omega}{v_A}}\right)\left(1+e^{\frac{2id_B \omega}{v_B}}\right)\left(1+e^{\frac{2id_C \omega}{v_C}}\right) v_B v_C = 0,$--.